(12) United States Patent  
Muraoka et al.

(10) Patent No.: US 8,092,195 B2
(45) Date of Patent: Jan. 10, 2012

(54) MOTOR AND FAN APPARATUS HAVING THE MOTOR

(75) Inventors: Koji Muraoka, Kyoto (JP); Junpei Kitamura, Kyoto (JP); Masashi Hirayama, Kyoto (JP); Takuya Teramoto, Kyoto (JP); Hiroyoshi Teshima, Kyoto (JP); Yuji Yabuuchi, Kyoto (JP)

(73) Assignee: Nidec Corporation, Kyoto (JP)

( * ) Notice: Subject to any disclaimer, the term of this patent is extended or adjusted under 35 U.S.C. 154(b) by 368 days.

(21) Appl. No.: 12/466,404

(22) Filed: May 15, 2009

(65) Prior Publication Data

US 2009/0285699 A1 Nov. 19, 2009

(30) Foreign Application Priority Data

May 16, 2008 (JP) ................................. 2008-129156
Feb. 13, 2009 (JP) ................................. 2009-030984

(51) Int. Cl.
*H02K 1/18* (2006.01)
(52) U.S. Cl. .................... 417/354; 417/423.1; 417/423.7
(58) Field of Classification Search .................. 417/354, 417/423.1, 423.7, 423.12
See application file for complete search history.

(56) References Cited

U.S. PATENT DOCUMENTS

| 6,097,120 | A | 8/2000 | Horng | |
|---|---|---|---|---|
| 7,221,069 | B2 | 5/2007 | Horng | |
| 2005/0006962 | A1* | 1/2005 | Horng | 310/51 |
| 2006/0181160 | A1* | 8/2006 | Chen | 310/51 |
| 2006/0232148 | A1* | 10/2006 | Chen | 310/68 B |
| 2007/0122293 | A1* | 5/2007 | Sugiyama et al. | 417/354 |
| 2007/0252451 | A1* | 11/2007 | Shibuya et al. | 310/64 |
| 2008/0042512 | A1* | 2/2008 | Otsuji | 310/216 |

FOREIGN PATENT DOCUMENTS

JP 4005670 B2 11/2007
* cited by examiner

*Primary Examiner* — Karabi Guharay
(74) *Attorney, Agent, or Firm* — Keating & Bennett, LLP

(57) ABSTRACT

An electric motor includes a stator portion, a rotor portion, and a bearing mechanism, wherein the rotor portion includes a rotor holder having a substantially cylindrical shape with a closed end, and a field magnet fixed to an inner circumference of the rotor holder; the stator portion includes a stator, a base portion to which the stator is fixed, and a magnetic member; and the magnetic member includes a cylindrical portion having a substantially cylindrical shape into which a lower end portion of an insulator of the stator is inserted, the lower end portion being a portion of an outer portion of the insulator and opposing the base portion, and a flat portion having a substantially annular shape which spreads outwardly in a radial direction from a lower edge of the cylindrical portion and opposes a lower edge of the field magnet.

16 Claims, 34 Drawing Sheets

MOTOR AND FAN APPARATUS HAVING THE MOTOR

BACKGROUND OF THE INVENTION

1. Field of the Invention

The present invention relates to an electric motor, and more specifically to a fan apparatus having the electric motor.

2. Description of the Related Art

Conventionally, some motors in fan apparatuses are constructed such that a rotor portion is attracted to a stator portion by using a magnetic attractive force in order to restrict rising of the rotor portion and an impeller relative to the stator portion during rotation. In such an arrangement, the motor is provided with an attracting magnet which contacts a tip end of a shaft or a magnetic member which faces a field magnet in a direction parallel to the center axis.

In such a motor, the magnetic member is fixed to the stator portion by various techniques. For example, in an axial fan motor disclosed in Japanese Patent Gazette No. 4005670, an annular printed wiring board is attached around a bushing into which a shaft is inserted, and an attracting member having a substantially annular shape for magnetically attracting a permanent magnet is attached on the top side (i.e., on the side toward a rotor) of the printed wiring board. A stator yoke having four standing portions which protrude upwardly from its outer circumference is further provided on the attracting member. Since these standing portions face a lower portion of the permanent magnet of the rotor in a direction perpendicular to the center axis, the permanent magnet is also attracted to the stator yoke to perform stable rotation of the rotor.

In a substantially annular-balancing portion in a motor disclosed in U.S. Pat. No. 7,221,069, an annular portion of the balancing portion is fixed around a cylindrical portion of a base into which a shaft is inserted. Four magnetic surfaces, which extend from the outer circumference of the annular portion toward a rotor, face an annular magnet of the rotor in a radial direction.

In a motor disclosed in U.S. Pat. No. 6,097,120, a balancing sheet having an opening formed in its center is attached around a cylindrical portion which is provided on an opposite end surface of a stator to a rotor. In the motor, the balancing sheet and a permanent magnet of the rotor face each other in a direction parallel to the center axis.

In another arrangement of the motor disclosed in U.S. Pat. No. 6,097,120, the balancing sheet and a core of the stator are formed as one member.

In a large-sized fan measuring 90 mm per side or the like or a fan having a high rotation speed, the magnetic attractive force generated between the magnetic member and the field magnet should be increased when compared with a small-sized fan or a fan having a low rotation speed, in order to prevent rising of the rotor portion relative to the stator portion.

However, the arrangements of the motors disclosed in Japanese Patent Gazette No. 4005670 and U.S. Pat. No. 6,097,120, are complicated or have a decreased flexibility of design of the stator to locate the magnetic member sufficiently close to the field magnet. Since a field magnet faces a magnetic member only in the direction perpendicular to the center axis, it is difficult to generate a sufficient magnetic attractive force by the magnetic member disclosed in U.S. Pat. No. 7,221,069.

SUMMARY OF THE INVENTION

Accordingly, preferred embodiments of the present invention easily locate a flat portion of a magnetic member close to the field magnet, wherein the magnetic member generates a magnetic attractive force between a field magnet and the magnetic member in the direction parallel or substantially parallel to the center axis.

An electric motor according to a preferred embodiment of the present invention includes a stator portion, a rotor portion arranged to rotate about a center axis, and a bearing mechanism arranged to rotatably support the rotor portion relatively to the stator portion, wherein the rotor portion includes a rotor holder having a substantially cylindrical shape with a closed end, and a field magnet fixed to an inner circumference of the rotor holder; the stator portion includes a stator which is disposed inside the rotor holder and arranged to generate a torque between the field magnet and the stator, a base portion located below the rotor holder, the stator being either directly or indirectly fixed to the base portion, and a magnetic member which is positioned between the field magnet and the base portion and generates a magnetic attractive force between the field magnet and the magnetic member; and the magnetic member includes a cylindrical portion having a substantially cylindrical shape into which a lower end portion of an insulator of the stator is inserted, the lower end portion being a portion of an outer portion of the insulator and opposing the base portion, and a flat portion having a substantially annular shape which spreads outwardly in a radial direction from a lower edge of the cylindrical portion and faces a lower edge of the field magnet.

According to a preferred embodiment of the present invention, since the lower end portion of the insulator is inserted into the cylindrical portion of the magnetic member, it is possible to easily locate the flat portion of the magnetic member close to the field magnet.

Other features, elements, steps, characteristics and advantages of the present invention will become more apparent from the following description of preferred embodiments thereof with reference to the attached drawings.

DETAILED DESCRIPTION OF THE PREFERRED EMBODIMENTS

In the following description, the upper side in a direction of the center axis J1 in drawing is simply referred to as "upper side", and the lower side in drawing is simply referred to as "lower side". The expressions of the "upper side" and the "lower side" do not necessarily coincide with the upper side and the lower side in the direction of gravity.

First Preferred Embodiment

Figure 1:
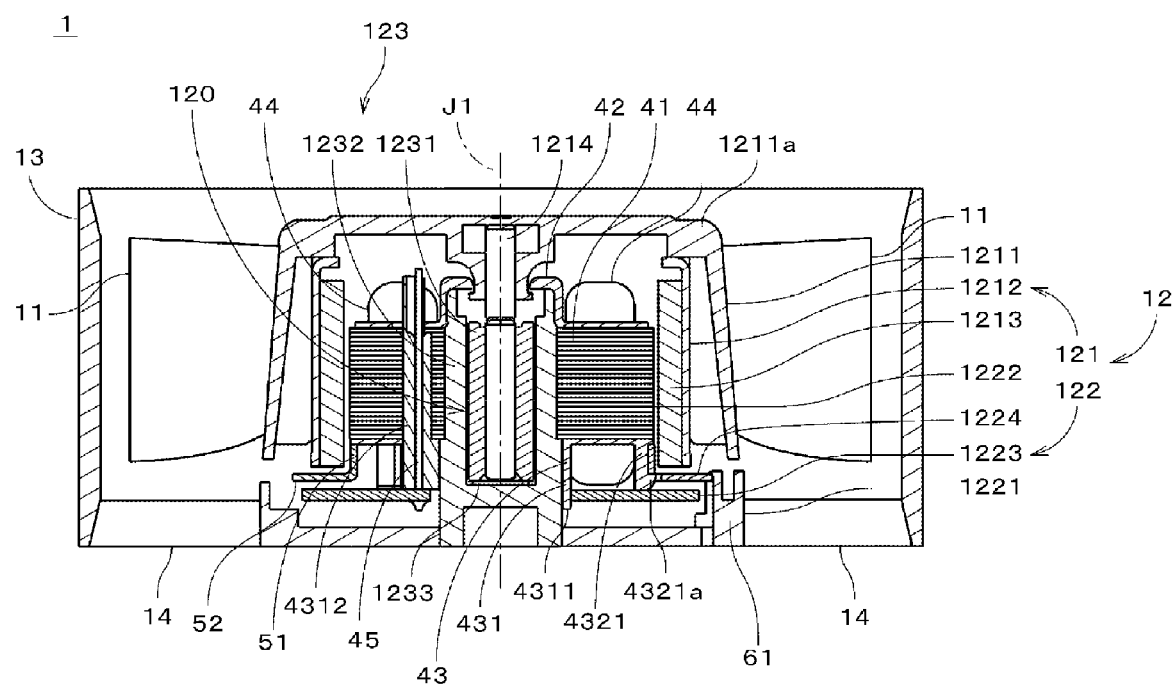
FIG. 1 is a cross-sectional view of an axial fan according to a first preferred embodiment of the present invention.

FIG. 1 is a longitudinal sectional view of an axial fan 1 which is a fan apparatus according to the first preferred embodiment of the present invention. The axial fan 1 has a motor 12 (for example, an electric single phase motor), a plurality of blades 11, a housing 13 surrounding the motor 12, and a plurality of supporting ribs 14. The housing 13 is connected to the motor 12 through the supporting ribs 14. The plurality of blades 11 are fixed to a rotor portion 121 of the motor 12 such that the plurality of supporting ribs 14 are arranged to support the motor 12.

The housing 13 and the supporting ribs 14 are preferably formed as a single member by, for example, injection molding with a resin or plastic. Alternatively, the housing 13 and the supporting ribs 14 may also be formed as a single member through aluminum die-casting. In FIG. 1, the outlines of the blades 11 and the supporting ribs 14 are shown on the right and left sides of the center axis J1 for convenience of illustration.

The motor 12 has a rotor portion 121 which is a rotating body, a stator portion 122 which is a fixed body, and a sleeve portion 123 which has a substantially cylindrical shape with a bottom and is fixed to the stator portion 122. The rotor portion 121 is located on the upper side of the stator portion 122 along the center axis J1 in the motor 12.

The rotor portion 121 preferably has a rotor holder 1211 having a substantially cylindrical shape with a closed end, a yoke 1212 made from metal, a field magnet 1213 having a substantially cylindrical shape, and a shaft 1214.

The yoke 1212 made from metal preferably has a cylindrical shape centered about the center axis J1. The substantially cylindrical-field magnet 1213 is fixed to an inner circumference of the rotor holder 1211 such that the yoke 1212 is sandwiched between the rotor holder 1211 and the substantially cylindrical-field magnet 1213. The shaft 1214 projects downwardly from the center portion of a lid portion 1211a of the rotor holder 1211. The plurality of blades 11 protrude outwardly in a radial direction from the outer circumference of the rotor holder 1211.

The stator portion 122 preferably has a base portion 1221 having a substantially annular shape, a stator 1222, a printed wiring board 1223 having a substantially annular shape, and a magnetic member 1224 having a substantially annular shape. The sleeve portion 123 is fixed to the center opening of the substantially annular base portion 1221. The stator 1222 is attached to an outer circumferential surface of the sleeve portion 123. The substantially annular-printed wiring board 1223 is preferably disposed below the stator 1222. The substantially annular-magnetic member 1224 is positioned between the field magnet 1213 of the rotor portion 121 and the printed wiring board 1223. The base portion 1221 is located below the rotor holder 1211. In other words, the base portion 1221 is located on the opposite side of the rotor holder 1211 from the side of a lid portion 1211a. The stator 1222 is fixed to the base portion 1221 indirectly via the sleeve portion 123.

The stator 1222 preferably has a stator core 41, an upper insulator 42, a lower insulator 43, and coils 44. The stator core 41 is formed by laminating thin plates of silicon steel. The upper insulator 42 and the lower insulator 43 cover the upper portion and the lower portion of the stator core 41. The coils 44 are preferably formed by winding conductive wires onto the upper insulator 42 and the lower insulator 43. The stator 1222 is positioned inside the rotor holder 1211 to oppose the field magnet 1213 in the radial direction. When a current is applied from an external power source (not shown) to the stator 1222 through the printed wiring board 1223, the stator 1222 is arranged to produce a magnetic field to generate a torque around the center axis J1 between the stator 1222 and the field magnet 1213.

The sleeve portion 123 preferably has a sleeve 1231, a sleeve housing 1232, and a thrust plate 1233. The sleeve 1231 preferably has a substantially cylindrical shape that is centered about the center axis J1. The sleeve housing 1232 is arranged to cover an outer circumferential surface and a lower portion of the sleeve 1231 and has a substantially cylindrical shape with a bottom. The thrust plate 1233 is disposed on an inner bottom surface of the sleeve housing 1232.

The shaft 1214 of the rotor portion 121 is inserted into the sleeve 1231, and a lower end of the shaft 1214 is arranged to contact the thrust plate 1233. The sleeve 1231 preferably is impregnated with lubricating oil, for example, and the lubricating oil is retained in the sleeve portion 123 by the sleeve housing 1232.

The sleeve 1231, the sleeve housing 1232, the thrust plate 1233, the shaft 1214, and the lubricating oil define a bearing mechanism 120 in the motor 12. The rotor portion 121 is rotatably supported relatively to the stator portion 122 in the motor 12. In the outer rotor type motor 12, the rotor portion 121 is arranged to rotate around the stator 1222 about the center axis J1 such that the blades 11 which protrude outwardly in the radial direction from the rotor portion 121 generate an air flow in the direction of the center axis J1 from the upper side toward the lower side of FIG. 1.

During rotation of the motor 12, the lower end of the shaft 1214 is preferably in continuous contact with the thrust plate 1233 due to a magnetic attractive force generated between the magnetic member 1224 and the field magnet 1213 in the axial fan 1. In this manner, the relative position in the direction of the center axis J1 between the rotor portion 121 and the stator portion 122 is fixed in the axial fan 1.

If the shaft 1214 were to move in the vertical direction, excessive contact occurs between the shaft 1214 and the sleeve 1231, and this contact results in noise and damage.

However, since the axial fan 1 has the above-described arrangement, it is possible to stably rotate the motor 12 while avoiding excessive contact thus minimizing noise and damage.

Figure 2:
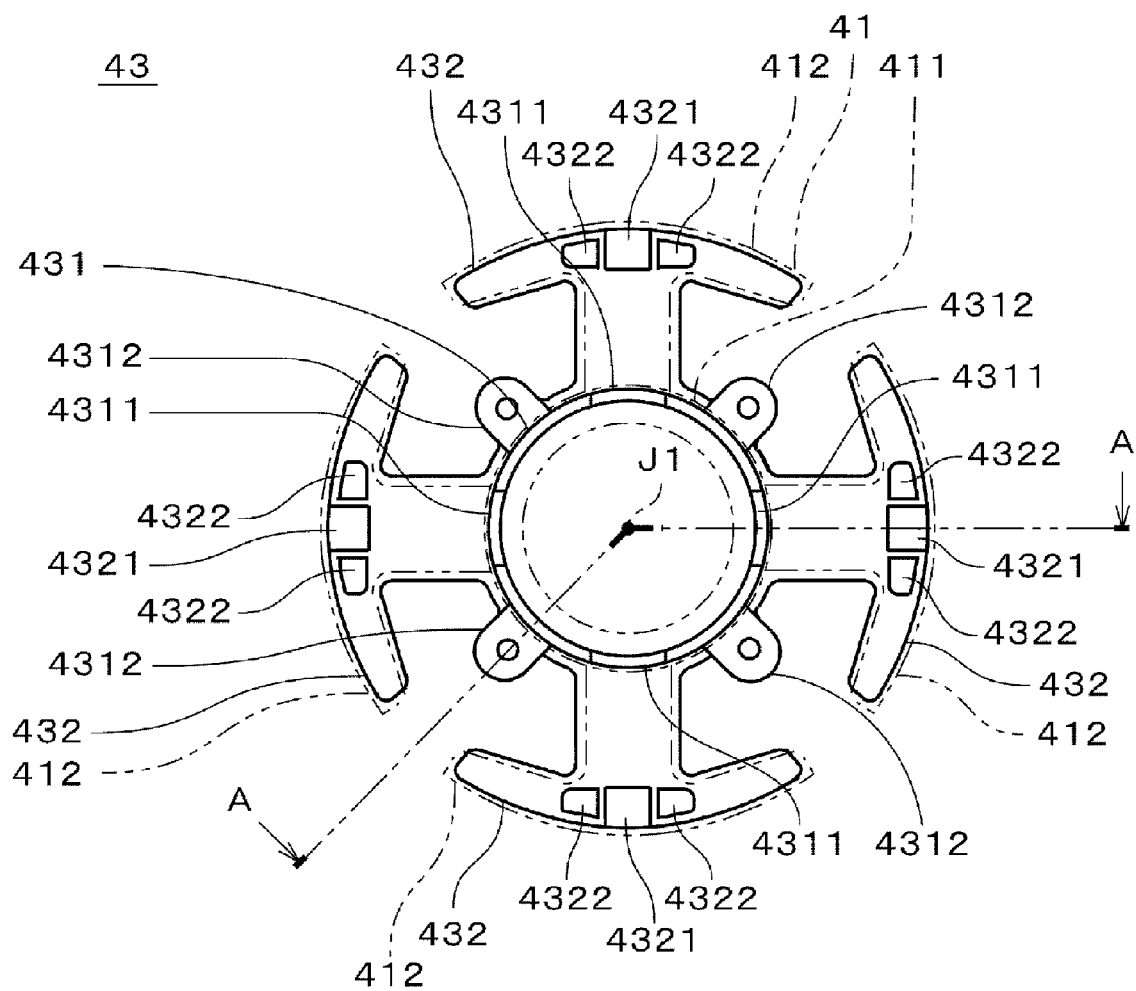
FIG. 2 is a bottom view of a lower insulator according to the first preferred embodiment of the present invention.
Figure 3:
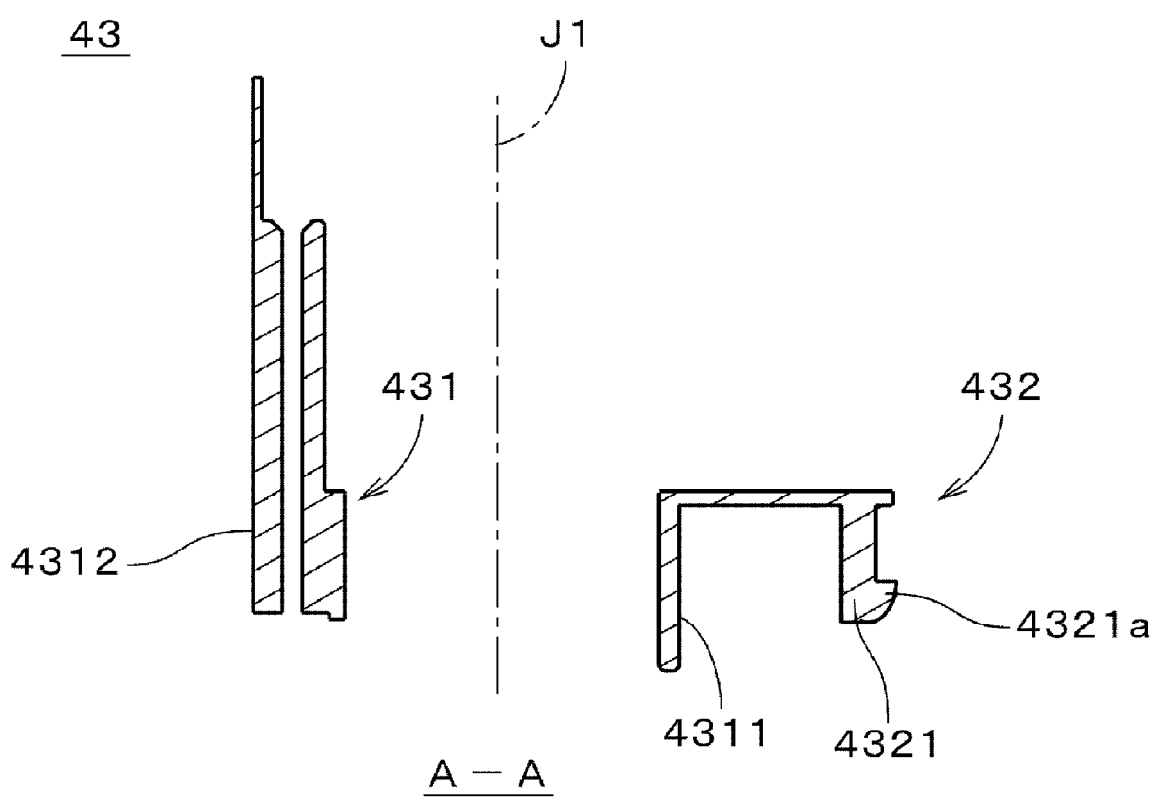
FIG. 3 is a cross-sectional view of the lower insulator.

FIG. 2 is a bottom view of the lower insulator 43, in which the outline of the stator core 41 is represented by two-dot chain lines. FIG. 3 is a cross-sectional view of the lower insulator 43 at the positions indicated by arrows A in FIG. 2.

As shown in FIG. 2, the stator core 41 has a center portion 411 having a substantially cylindrical shape and four, for example, T-shaped tooth portions 412 which extend outwardly in the radial direction with respect to the center axis J1 from the outer circumference of the center portion 411, wherein outer end portions of the tooth portions 412 spread in the both sides in a circumferential direction. The lower insulator 43 has an annular portion 431 which overlaps with the center portion 411 of the stator core 41 in the direction parallel or substantially parallel to the center axis J1 and four, for example, tooth covering portions 432 arranged to cover the tooth portions 412. The tooth portion 412 slightly protrude to the outside of the tooth covering portion 432 in the radial direction.

As shown in FIGS. 2 and 3, the annular portion 431 is provided with four, for example, protrusions 4311 which extend downwardly at connected positions of the tooth covering portions 432 and four, for example, pin inserting portions 4312 protruding outwardly in the radial direction from an outer circumferential surface of the annular portion 431. As shown in FIG. 3, the pin inserting portion 4312 is arranged to extend upwardly from the annular portion 431 in parallel or substantially in parallel with the center axis J1, and a pin 45 is inserted into the pin inserting portion 4312 as shown in FIG. 1. An upper end of the pin 45 is connected to a lead wire (not shown) of a coil which is wound around the stator core 41, and a lower end of the pin 45 is inserted into a hole defined in the printed wiring board 1223 and connected to an opposite surface of the printed wiring board 1223 to the stator 1222, that is, a lower surface of the printed wiring board 1223.

As shown in FIGS. 2 and 3, four protrusions 4321 which protrude toward the base portion 1221 (see FIG. 1) and have a bar shape are provided in the center positions of tip ends of the four tooth covering portions 432. As shown in FIG. 3, a tip end 4321a of the protrusion 4321 protrudes outwardly in the radial direction. As shown in FIG. 2, two protrusions 4322 extending downwardly are provided on the both sides in the circumferential direction of the protrusion 4321.

As shown in FIG. 1, the protrusion 4311 of the annular portion 431 and the tip end 4321a of the protrusion 4321 are in contact with an inner circumferential surface and an upper surface of the printed wiring board 1223, respectively, to determine the relative position between the printed wiring board 1223 and the lower insulator 43. The printed wiring board 1223 and the lower insulator 43 are fixed by connecting the printed wiring board 1223 and the pins 45 inserted in the pin inserting portions 4312.

Figure 4:
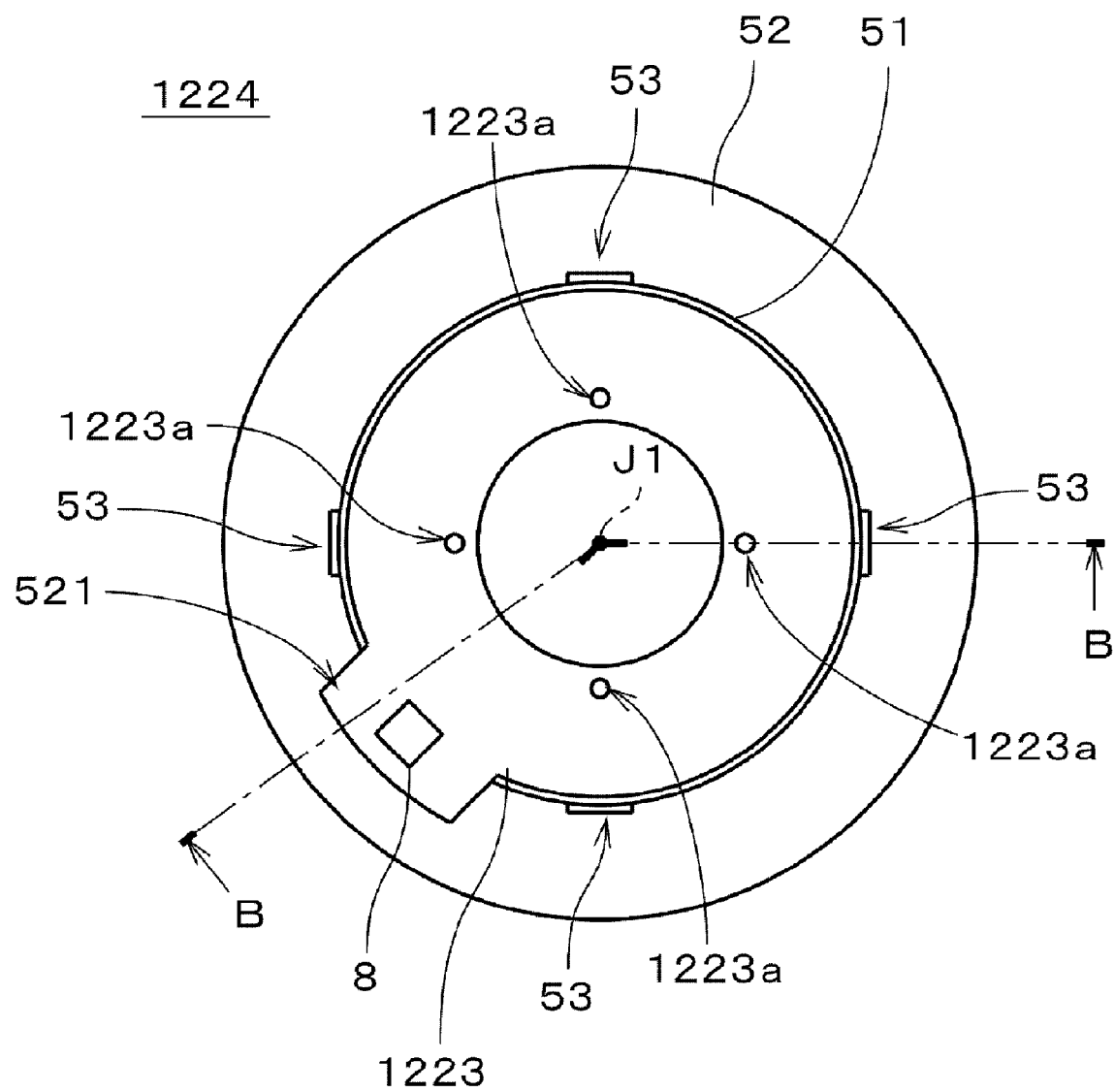
FIG. 4 is a plan view of a magnetic member according to the first preferred embodiment of the present invention.
Figure 5:
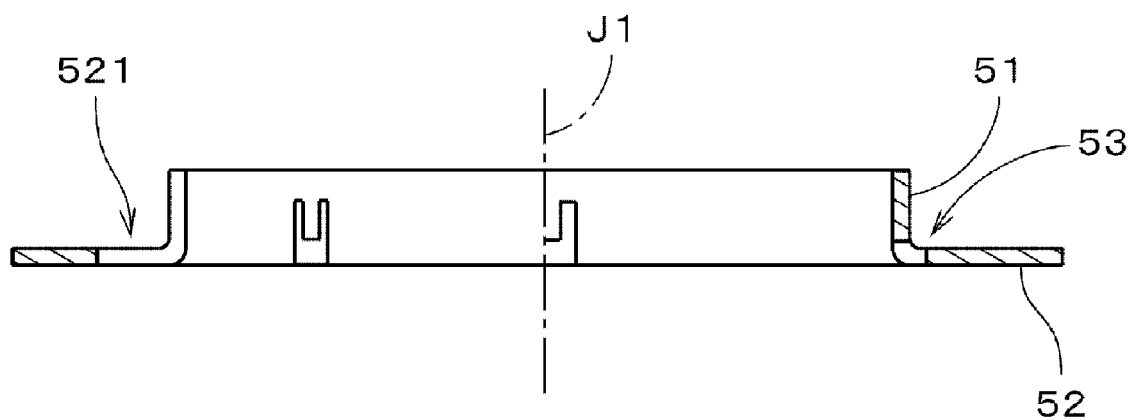
FIG. 5 is a cross-sectional view of the magnetic member.

FIG. 4 is a plan view showing the magnetic member 1224, together with the printed wiring board 1223 located below the magnetic member 1224. FIG. 5 is a cross-sectional view of the magnetic member 1224 at the positions indicated by arrows B in FIG. 4. As shown in FIG. 5, the cross-section of the magnetic member 1224 defined by a plane including the center axis J1 has an L-shape in the circumferential direction. The magnetic member 1224 is preferably formed by press working easily at low cost. Specifically, magnetic material such as a zinc plated steel sheet is preferably punched out as one annular plate, and the plate is bent by deep drawing so that the inner portion is bent parallel to the center axis J1 to form the magnetic member 1224.

As shown in FIGS. 4 and 5, the magnetic member 1224 has a cylindrical portion 51 having a substantially cylindrical shape and extending in parallel or substantially parallel with the center axis J1 and a flat portion 52 having a substantially annular shape which spreads outwardly in the radial direction with respect to the center axis J1 from the lower end of the cylindrical portion 51. As shown in FIG. 1, the cylindrical portion 51 opposes a lower portion of an inner circumferential surface of the field magnet 1213 in the direction perpendicular or substantially perpendicular to the center axis J1. The flat portion 52 opposes a lower edge of the field magnet 1213 in the direction parallel or substantially parallel to the center axis J1.

Figure 6:
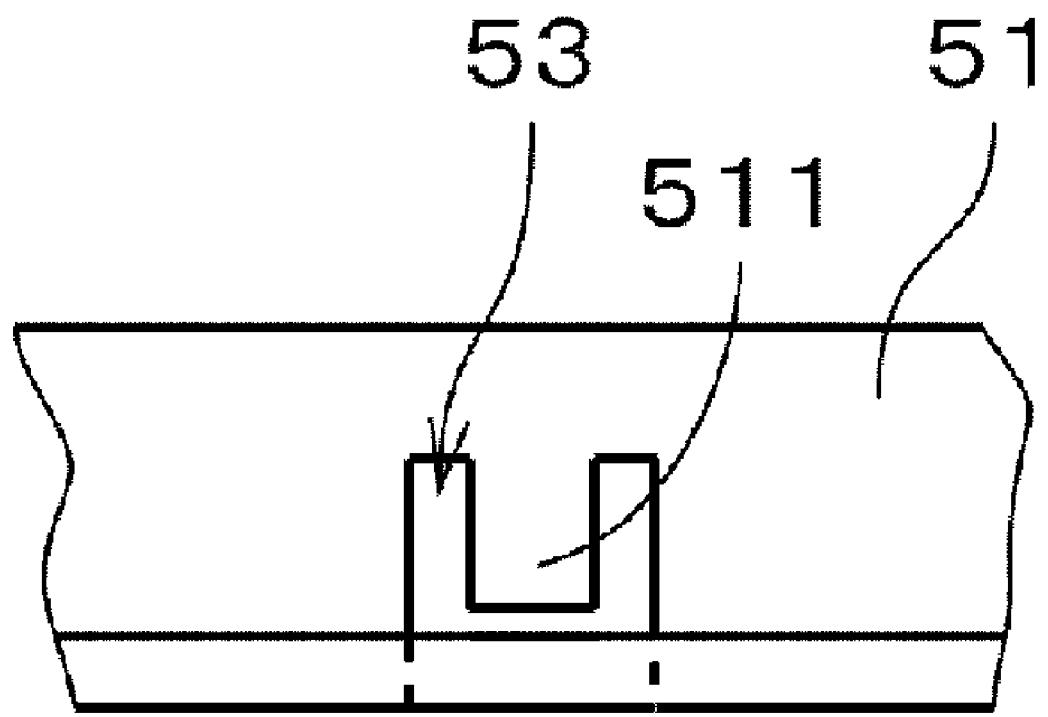
FIG. 6 is an enlarged view showing a portion of the magnetic member.

As shown in FIGS. 4 and 5, the flat portion 52 preferably has one notch 521 which is formed by cutting out a portion of the inner portion. At the position where the notch 521 is provided, the cylindrical portion 51 is removed from the upper end to the lower end in parallel or substantially in parallel with the center axis J1. Small holes 53 are preferably defined at a lower portion of the cylindrical portion 51 and an inner portion of the flat portion 52, and the holes 53 are preferably cut out at regular intervals in the circumferential direction with respect to the center axis J1. FIG. 6 is a view showing the vicinity of the hole 53 which is viewed from the outside in the radial direction. The hole 53 is preferably substantially U-shaped in which two upper portions extend separately, and a portion located in the substantially U-shaped hole 53 in the circumferential direction is a convex portion 511 which projects downwardly in the cylindrical portion 51.

As shown in FIG. 4, a hall element 8 is preferably provided on the printed wiring board 1223 and the hall element 8 and notch 521 are preferably positioned as to overlap with each other in the direction parallel or substantially parallel to the center axis J1. The hall element 8 opposes the field magnet 1213 (see FIG. 1) through the notch 521. With this structure, the hall element 8 can detect the magnetic field of the field magnet 1213 without influences of the magnetic member 1224 to detect the rotation position of the field magnet 1213. Since the printed wiring board 1223 is provided with the notch 521, a portion between magnetic poles of the field magnet 1213 is preferably positioned at the notch 521 during stopping of the motor 12. A stopping position in the circumferential direction of the rotor portion 121 becomes a specific position to thereby prevent startup errors of the motor 12.

Figure 7:
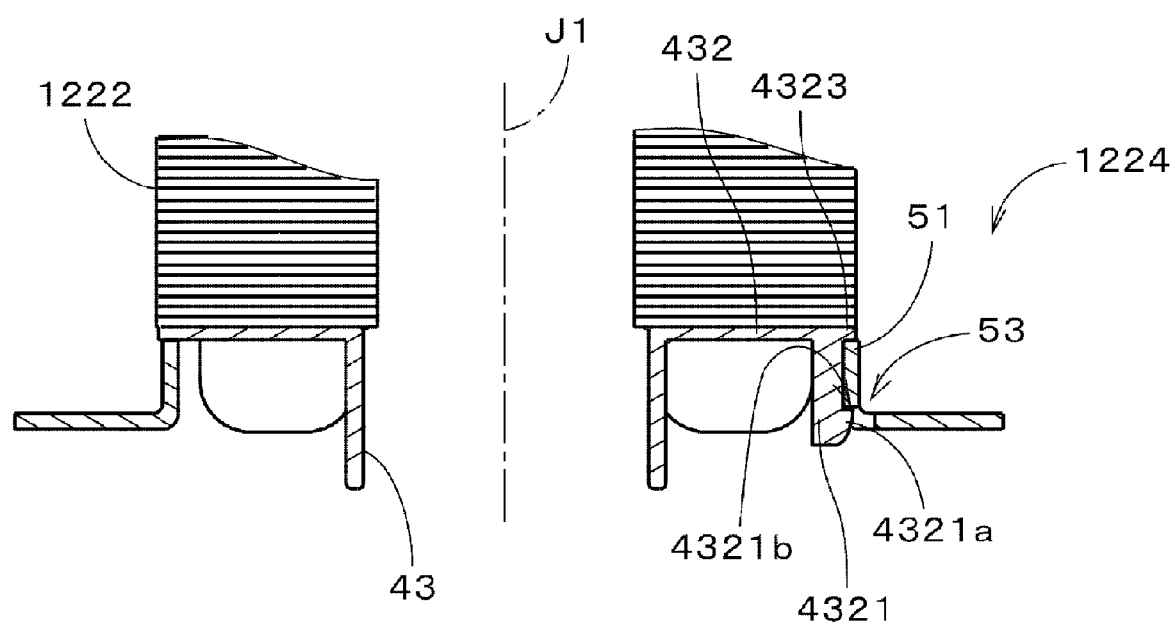
FIG. 7 is a cross-sectional view of a stator and the magnetic member.

FIG. 7 is an enlarged view of the stator 1222 and the magnetic member 1224. As shown in FIG. 7, a protrusion 4321 provided in the lower insulator 43 of the stator 1222 is inserted into the cylindrical portion 51 of the magnetic member 1224, and the cylindrical portion 51 contacts outer surfaces of the protrusion 4321. With this structure, the relative positions of the cylindrical portion 51 and the lower insulator 43 in the direction perpendicular or substantially perpendicular to the center axis J1 is fixed. The tip end 4321*a* of the protrusion 4321 is positioned in the hole 53 of the magnetic member 1224 and engaged with the hole 53 in the circumferential direction. Thus, the orientation of the magnetic member 1224 in the circumferential direction relative to the lower insulator 43 is fixed.

An upper surface 4321*b* of the tip end 4321*a* contacts the tip end of the convex portion 511 shown in FIG. 6, and an outer peripheral portion 4323 of the tooth covering portion 432 contacts the upper end of the cylindrical portion 51 around the whole circumference. That is to say, the tip end 4321*a* of the protrusion 4321 and the outer peripheral portion 4323 of the tooth covering portion 432 are engaged with the cylindrical portion 51 of the magnetic member 1224 in the direction parallel to the center axis J1. With this engagement, the position of the magnetic member 1224 relative to the lower insulator 43 in the direction of the center axis J1 is fixed.

Figure 8:
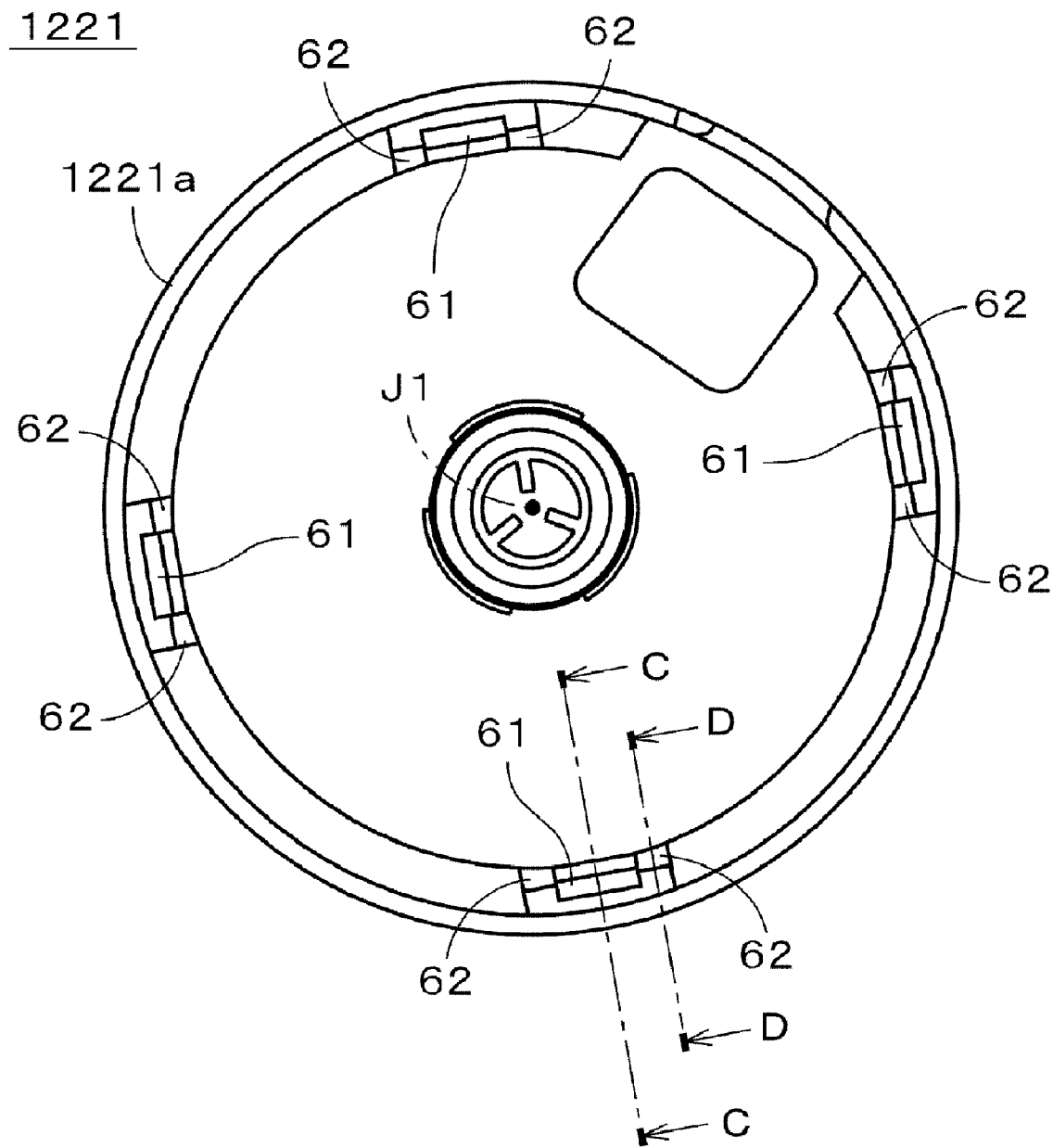
FIG. 8 is a plan view of a base portion according to the first preferred embodiment of the present invention t.
Figure 9:
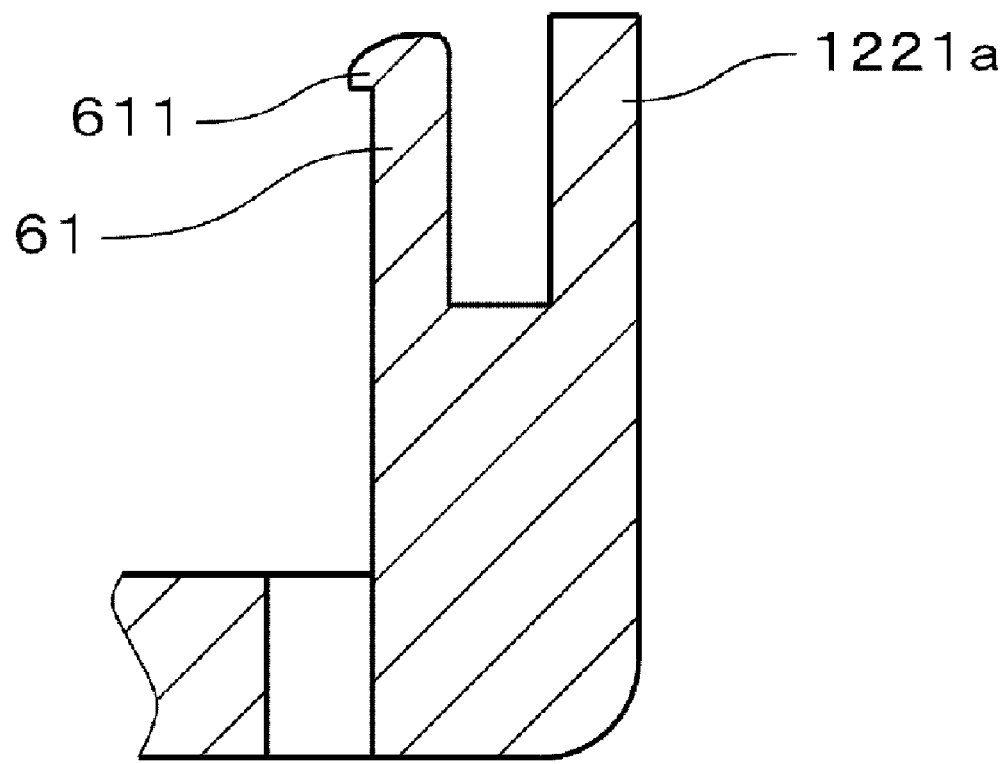
FIG. 9 is a cross-sectional view of a protrusion of the base portion.
Figure 10:
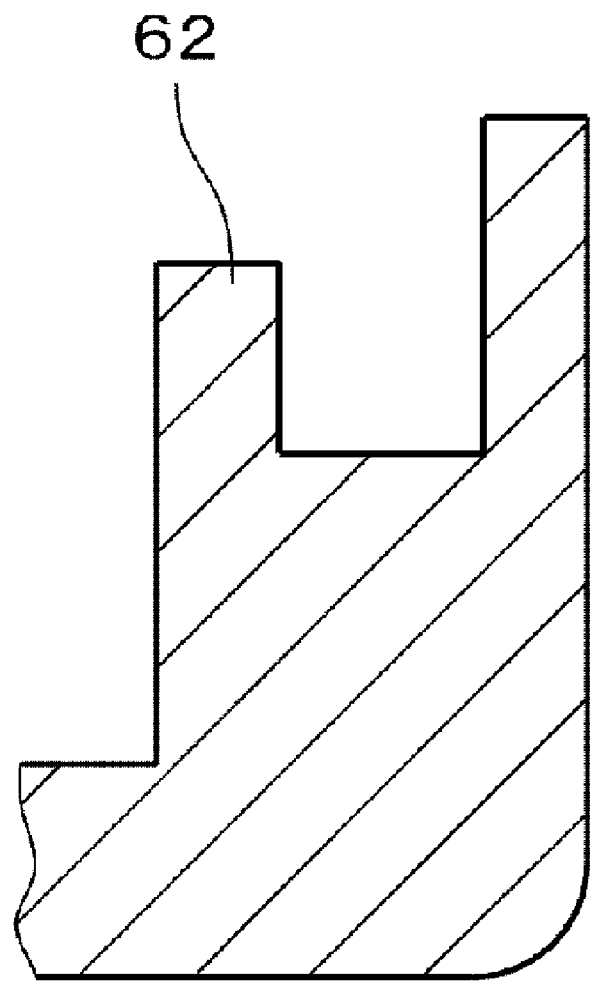
FIG. 10 is a cross-sectional view of another protrusion of the base portion.

FIG. 8 is a plan view of the base portion 1221, and FIGS. 9 and 10 are cross-sectional views of the base portion 1221 at the positions indicated by arrows C and D in FIG. 8.

As shown in FIGS. 8 and 9, the base portion 1221 preferably has four, for example, protrusions 61 which are arranged at regular intervals inside an outer side wall 1221*a* that extends in the circumferential direction, and which extend in parallel or substantially in parallel with the center axis J1. As shown in FIG. 9, a tip end 611 of the protrusion 61 protrudes inwardly in the radial direction slightly. As shown in FIGS. 8 and 10, two auxiliary protrusions 62 are provided on the both sides in the circumferential direction of the protrusion 61.

Figure 11:
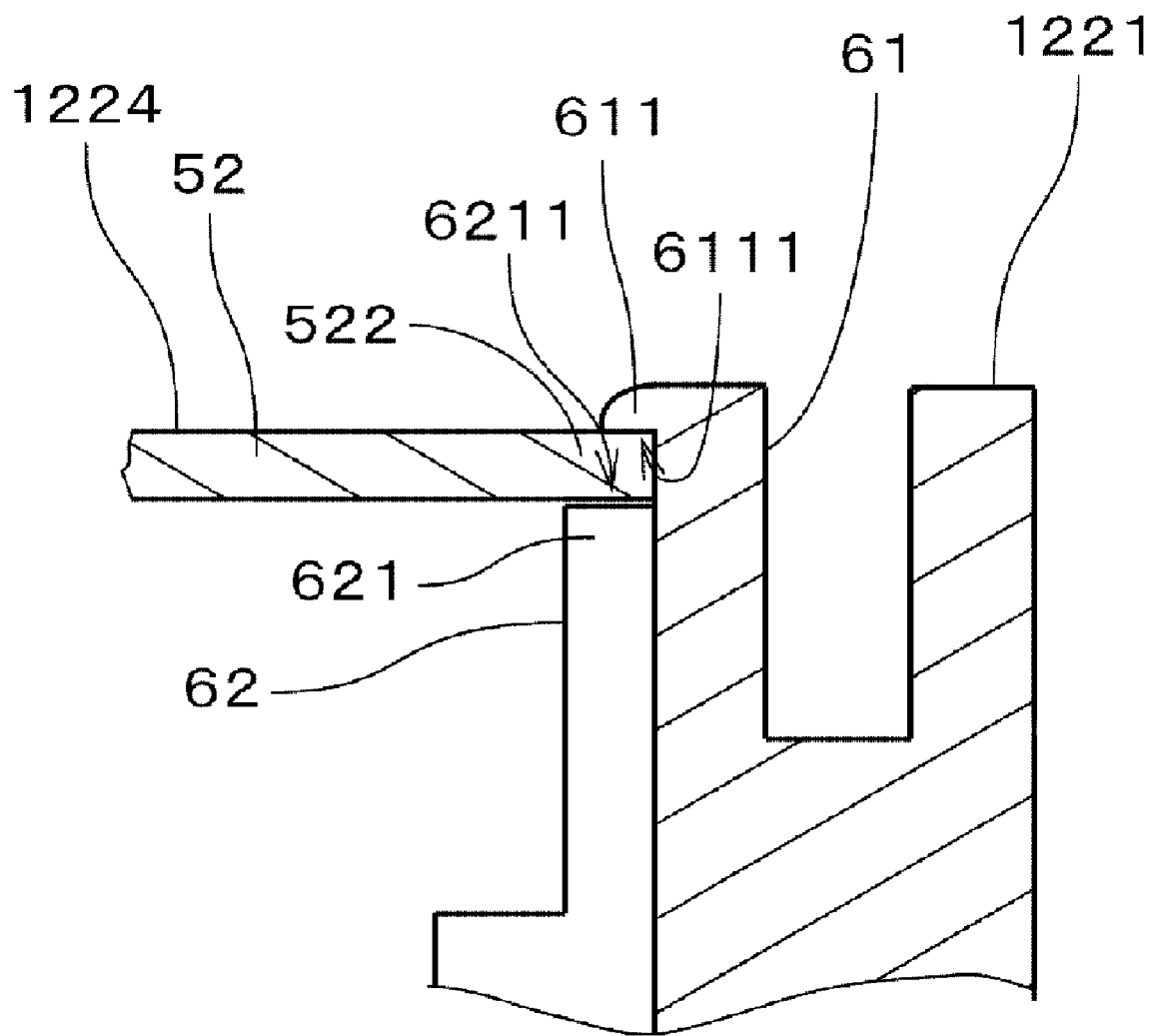
FIG. 11 is a cross-sectional view of the protrusion of the base portion and a flat portion of the magnetic member.

FIG. 11 is a cross-sectional view showing a state where the flat portion 52 of the magnetic member 1224 is fitted with the protrusion 61, together with the auxiliary protrusion 62. The protrusion 61 is located outside the flat portion 52, and the auxiliary protrusion 62 is located below an outer peripheral portion 522 of the flat portion 52. The tip end 611 of the protrusion 61 is located above a tip end 621 of the auxiliary protrusion 62. The distance between a lower surface 6111 of the tip end 611 of the protrusion 61 and the upper surface 6211 of the tip end 621 of the auxiliary protrusion 62 in the direction parallel or substantially parallel to the center axis J1 (see FIG. 1) is made almost equal to the thickness of the flat portion 52. In the motor 12, the upper surface of the flat portion 52 contacts the lower surface 6111 of the tip end 611 of the protrusion 61. In other words, the flat portion 52 is fixed to the base portion 1221 by engaging the flat portion 52 with the protrusion 61 in the direction parallel or substantially parallel to the center axis J1 in the motor 12. The lower surface of the flat portion 52 and the upper surface 6211 of the auxiliary protrusion 62 are arranged slightly apart from each other.

As discussed above, in the axial fan 1 shown in FIG. 1, the cylindrical portion 51 of the magnetic member 1224 contacts the outer surfaces of the protrusions 4321 of the lower insulator 43. The cylindrical portion 51 and the flat portion 52 are engaged with the tip ends 4321*a* of the protrusions 4321 of the lower insulator 43 and the protrusions 61 of the base portion 1221, respectively, in the direction parallel or substantially parallel to the center axis J1. Thus, the position of the magnetic member 1224 in the stator portion 122 is fixed.

Next discussion will be made on an operation for fixing the magnetic member 1224 to the lower insulator 43 and the base portion 1221.

The upper insulator 42 (see FIG. 1) and the lower insulator 43 shown in FIG. 2 are attached to the stator core 41, conductive wires are wound around the stator core 41 together with both insulators, and the stator 1222 (see FIG. 1) is prepared in advance.

First, the magnetic member 1224 shown in FIG. 4 is disposed below the lower insulator 43 so that the holes 53 coincide with the protrusions 4321 of the lower insulator 43 in the direction parallel or substantially parallel to the center axis J1. The protrusions 4321 of the lower insulator 43 are inserted into the cylindrical portion 51 of the magnetic member 1224.

Figure 12:
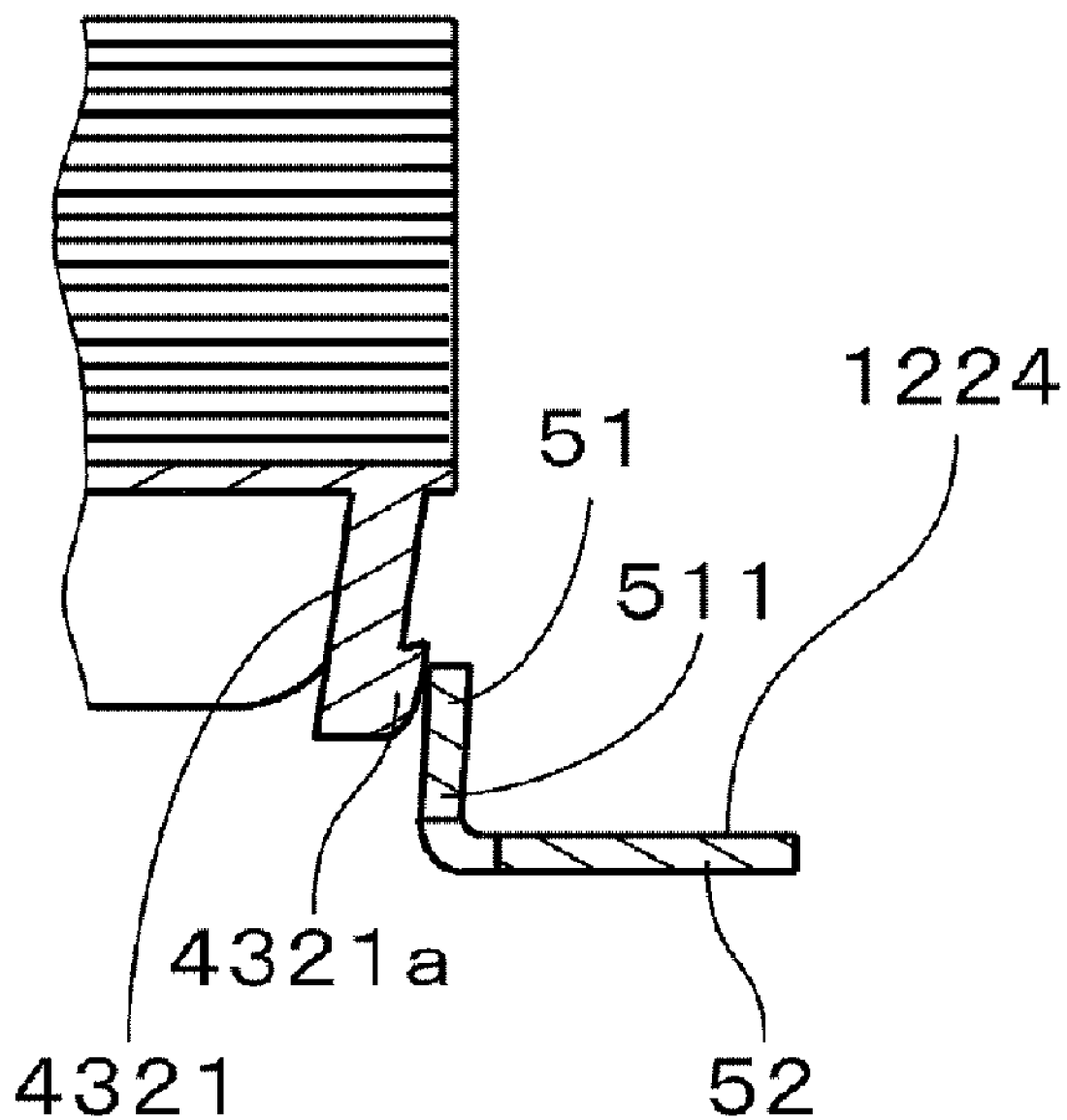
FIG. 12 is a cross-sectional view of the stator and the magnetic member.

At this time, as shown in FIG. 12, the tip ends 4321*a* of the protrusions 4321 contact an upper portion of the cylindrical portion 51 of the magnetic member 1224 and the protrusions 4321 are elastically deformed inwardly in the radial direction. After the protrusions 4321 are further inserted into the cylindrical portion 51, the tip ends 4321*a* press the convex portions 511 of the cylindrical portion 51 shown in FIG. 6, and then the convex portions 511 are elastically deformed outwardly in the radial direction with respect to the center axis J1 (toward the front side when viewed on the paper in FIG. 6).

After the tip ends 4321*a* of the protrusions 4321 move to the flat portion 52, the convex portions 511 and the protrusions 4321 return to the original positions. As shown in FIG. 7, the tip ends 4321*a* of the protrusions 4321 are engaged with the holes 53 of the magnetic member 1224 in the direction parallel to the center axis J1. The cylindrical portion 51 contacts the outer surfaces of the protrusions 4321 of the lower insulator 43. The upper end of the cylindrical portion 51 contacts the outer peripheral portions 4323 of the tooth covering portions 432.

An operation for fitting the magnetic member 1224 to the lower insulator 43 is preferably performed after the conductive wires are wound around the stator core 41 to form coils. Therefore, the operation process is not complicated.

The stator 1222 and the magnetic member 1224 are vertically inversed from the state shown in FIG. 7, and the printed wiring board 1223 (see FIG. 1) is put on the lower insulator 43 from the upper side. As shown in FIG. 4, the hall element 8 and the notch 521 of the magnetic member 1224 oppose each other in the direction parallel or substantially parallel to the center axis J1.

The pins 45 (see FIG. 1) of the stator 122 are inserted into holes 1223*a* of the printed wiring board 1223. By joining the printed wiring board 1223 and the pins 45, the printed wiring board 1223 and the lower insulator 43 are fixed. When the printed wiring board 1223 is fitted to the lower insulator 43, the fitting direction of the printed wiring board 1223 in the direction perpendicular or substantially perpendicular to the center axis J1, that is, the orientation of the printed wiring board 1223 in the circumferential direction, is easily determined by using the notch 521 of the magnetic member 1224 as a mark.

Figure 13:
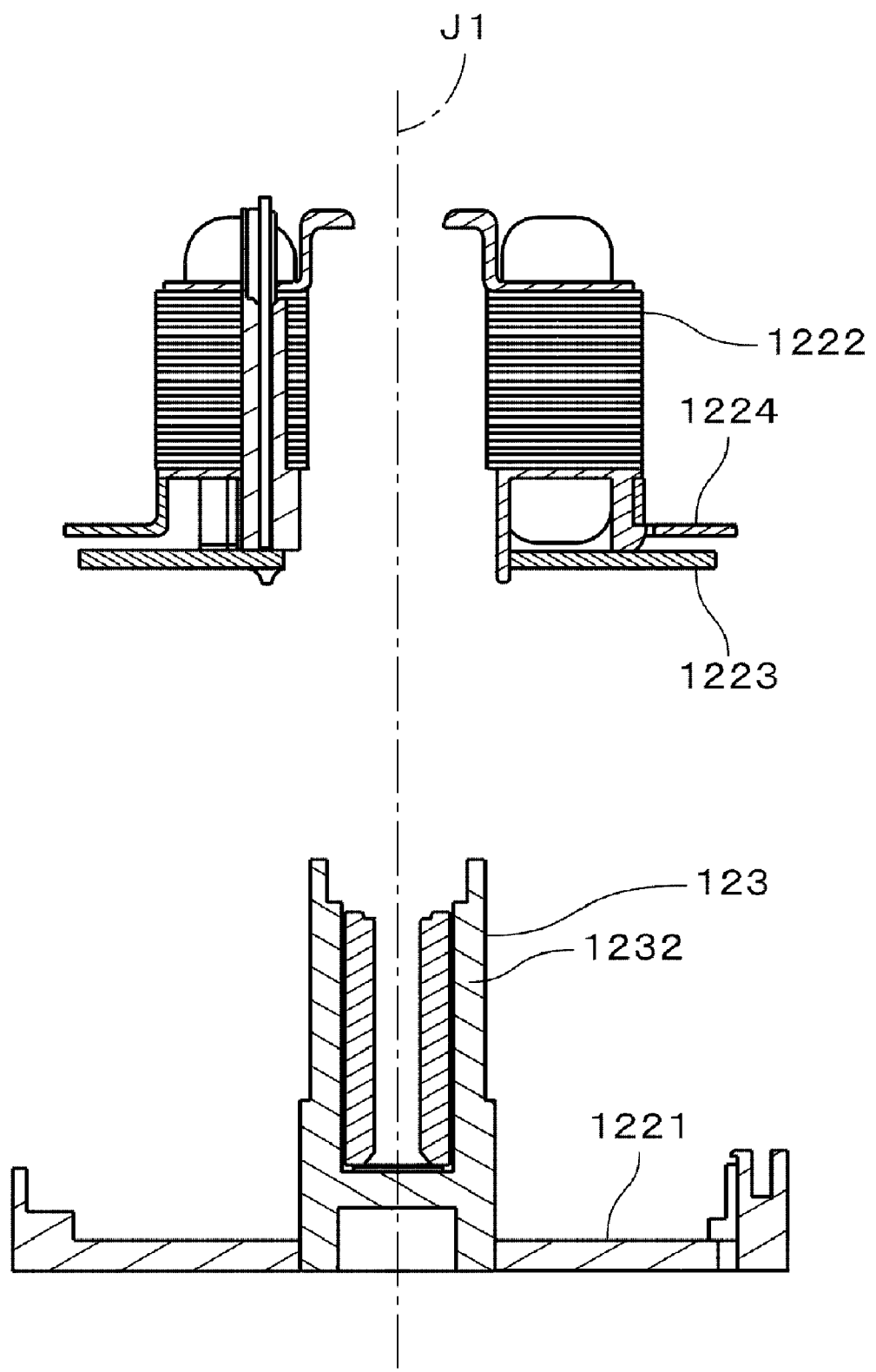
FIG. 13 is a view showing a state where the stator is fixed to a sleeve portion.

As shown in FIG. 13, the sleeve portion 123 is fixed to an opening of the base portion 1221 which is prepared separately. An assembly of the stator 1222, the printed wiring board 1223, and the magnetic member 1224 and the base portion 1221 which is fixed to the sleeve portion 123 are disposed to oppose each other with their center axes J1 coinciding with one another. Then, the sleeve portion 123 is inserted into the stator 1222, the printed wiring board 1223, and the magnetic member 1224 along the center axis J1.

Figure 14:
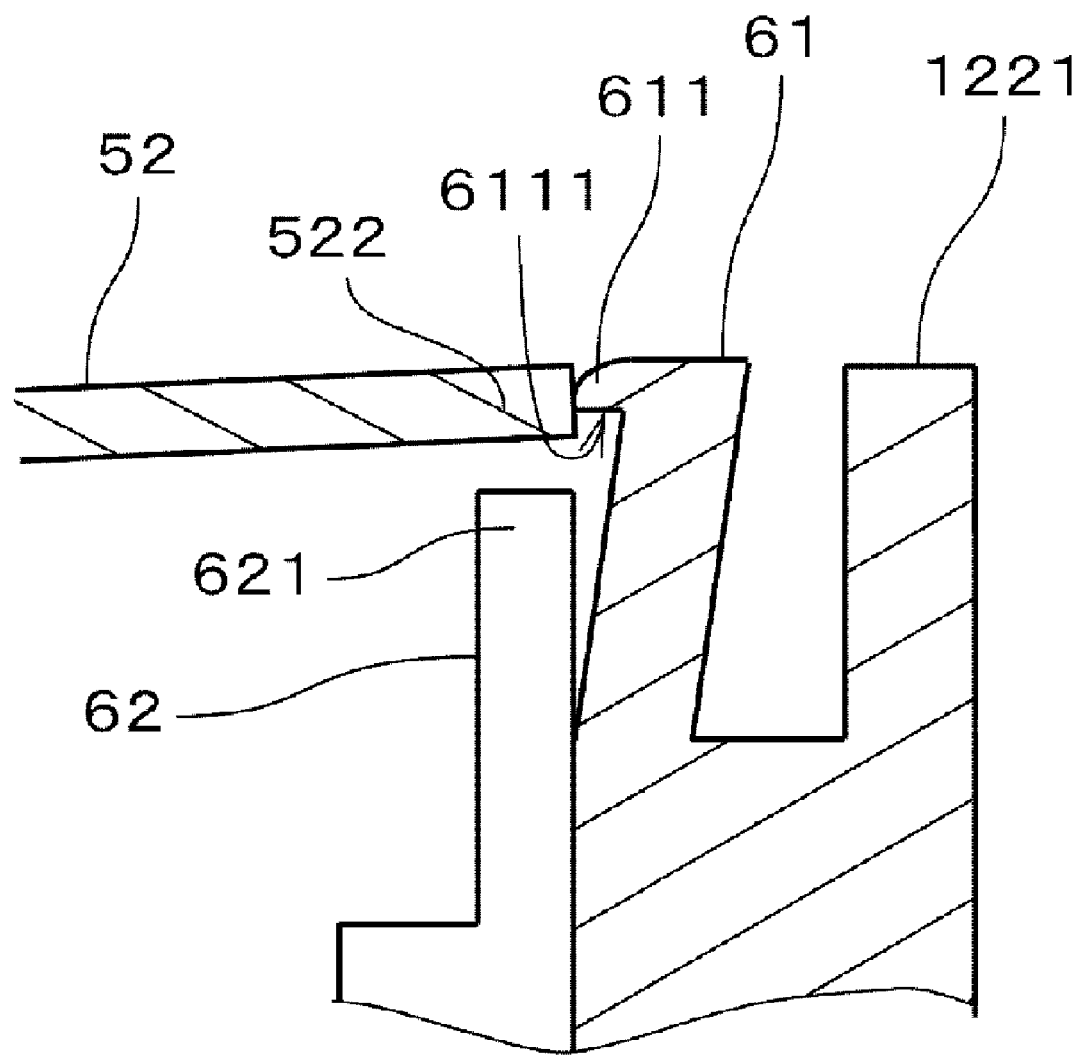
FIG. 14 is a cross-sectional view of the protrusion of the base portion and the flat portion of the magnetic member.

In this time, as shown in FIG. 14, the flat portion 52 is pressed downwardly, and the outer peripheral portion 522 contacts the tip ends 611 of the protrusions 61 of the base portion 1221 to elastically deform the protrusions 61 to move the protrusions 61 outwardly in the radial direction. Further, the flat portion 52 contacts the tip ends 621 of the auxiliary protrusions 62 by pressing the flat portion 52 downwardly, and the protrusions 61 return to the original positions. Thus, the positions of the outer peripheral portion 522 of the flat portion 52 in the direction of the center axis J1 are fixed relatively to the base portion 1221.

Through the above operation, fixing of the magnetic member 1224 to the lower insulator 43 and the base portion 1221 is completed. The stator 1222 and the sleeve housing 1232 shown in FIG. 13 are fixed by, for example, press fitting and adhesive.

In the axial fan 1 according to the first preferred embodiment, the protrusions 4321 of the lower insulator 43 are inserted into the cylindrical portion 51 of the magnetic member 1224. Therefore, the position of the magnetic member 1224 in the direction of the center axis J1 can be easily altered without largely changing the shape of the lower insulator 43. As a result, it is possible to easily locate the flat portion 52 of the magnetic member 1224 close to the field magnet 1213.

The magnetic member 1224 can be stably fitted with the lower insulator 43 by the protrusions 4321 through a simple structure. Since the cylindrical portion 51 contacts the outer surfaces of the protrusions 4321, it is possible to easily keep the flat portion 52 horizontally, that is, perpendicular or substantially perpendicular to the center axis J1, while the center axis of the magnetic member 1224 appropriately coincides with the center axis J1 of the motor 12.

Further, the tip ends 4321a of the protrusions 4321 and the outer peripheral portions 4323 of the tooth covering portions 432 are engaged with the holes 53 and the upper end of the cylindrical portion 51, respectively, in the direction parallel or substantially parallel to the center axis J1. With this structure, the position of the magnetic member 1224 in the direction parallel or substantially parallel to the center axis J1 is fixed easily. Since the protrusions 61 of the base portion 1221 are engaged with the flat portion 52 in the direction parallel or substantially parallel to the center axis J1, the magnetic member 1224 is more stably fixed.

The four hall portions 53 of the magnetic member 1224 are preferably small, and therefore an influence of the holes 53 on the magnetic attractive force generated between the field magnet 1213 and the magnetic member 1224 is small. Since the number of notches or holes provided in the magnetic member 1224 is preferably one (i.e., only the notch 521), the large area of the magnetic member 1224 can be maintained.

Thus, even if the notch is provided in the magnetic member 1224, it is possible to decrease a loss of magnetic attractive force generated between the field magnet 1213 and the magnetic member 1224 in the axial fan 1. The notch 521 shown in FIG. 4 may be a slit which is elongated in the radial direction as long as the width in the circumferential direction of the notch 521 is made larger than that of the hall element 8.

Figure 15:
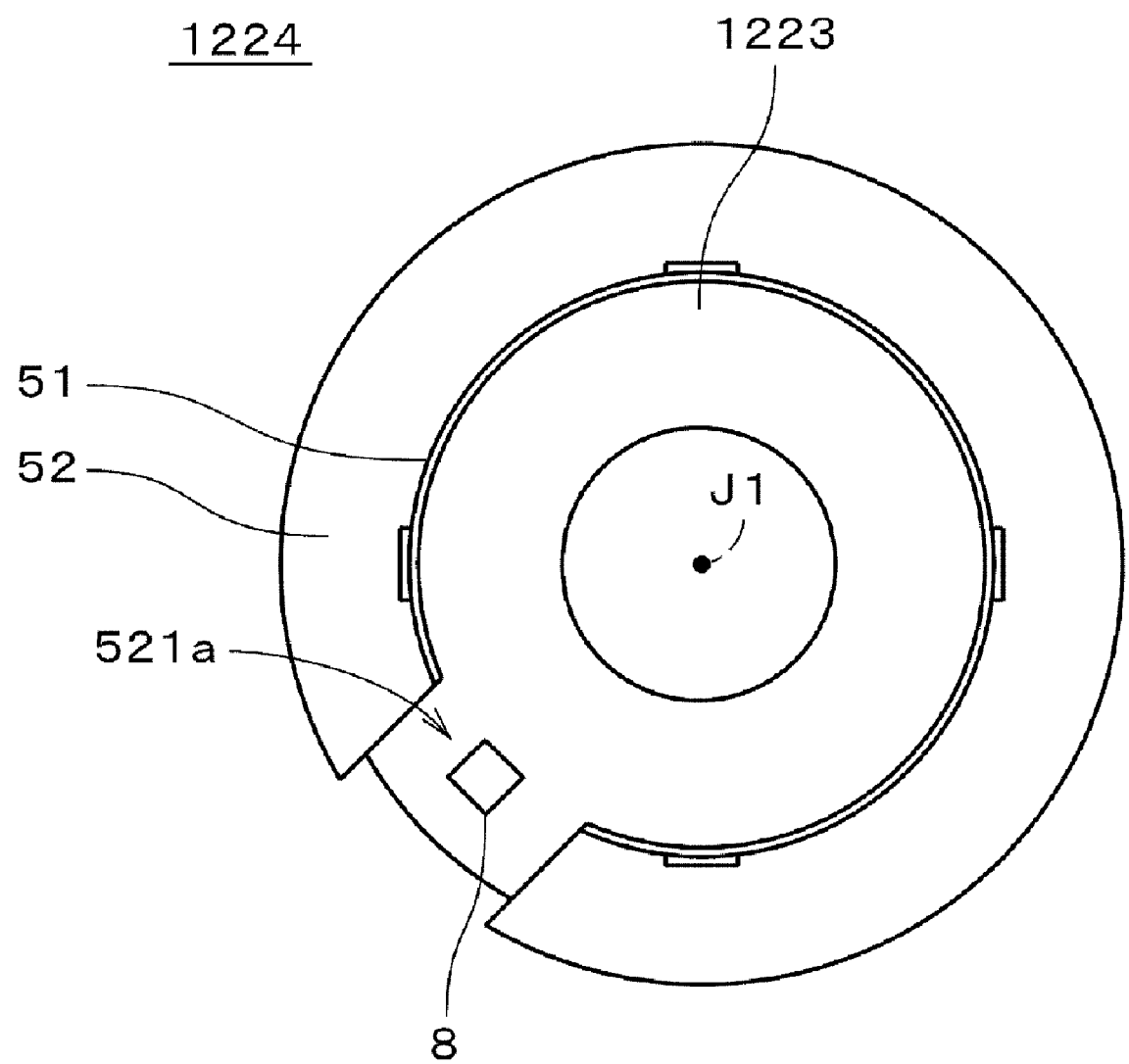
FIG. 15 is a plan view showing another example of the magnetic member.

FIG. 15 is a plan view showing another example of the magnetic member 1224, together with the printed wiring board 1223 which is located below the magnetic member 1224. The magnetic member 1224 shown in FIG. 15 is substantially C-shaped in plan view. In the magnetic member 1224, a notch 521a is arranged to cut across the flat portion 52 outwardly in the radial direction with respect to the center axis J1. At the position where the notch 521a is provided, a portion of the cylindrical portion 51 is removed from the upper end to the lower end in parallel with the center axis J1.

In the printed wiring board 1223, the hall element 8 is disposed as to overlap with the field magnet 1213 (see FIG. 1) through the notch 521a in the direction parallel or substantially parallel to the center axis J1. The other aspects of the magnetic member 1224 shown in FIG. 15 are preferably the same as that shown in FIG. 4. Also in the magnetic member 1224 of FIG. 15, the number of the notch 521a provided in the flat portion 52 may be (substantially) one. Thus, it is possible to decrease a loss of magnetic attractive force generated between the field magnet 1213 and the magnetic member 1224.

Figure 16:
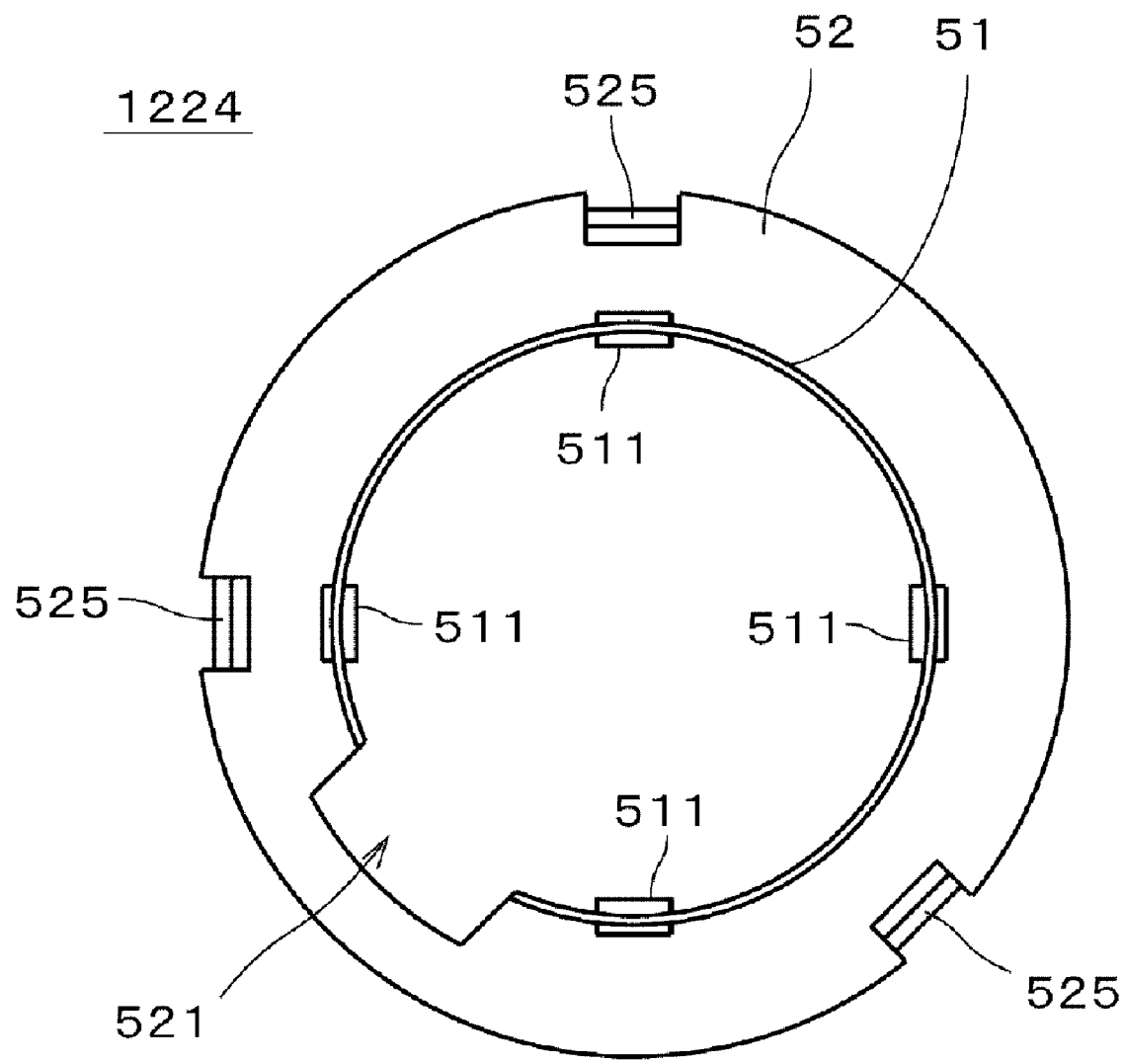
FIG. 16 is a plan view showing still another example of the magnetic member.
Figure 17:
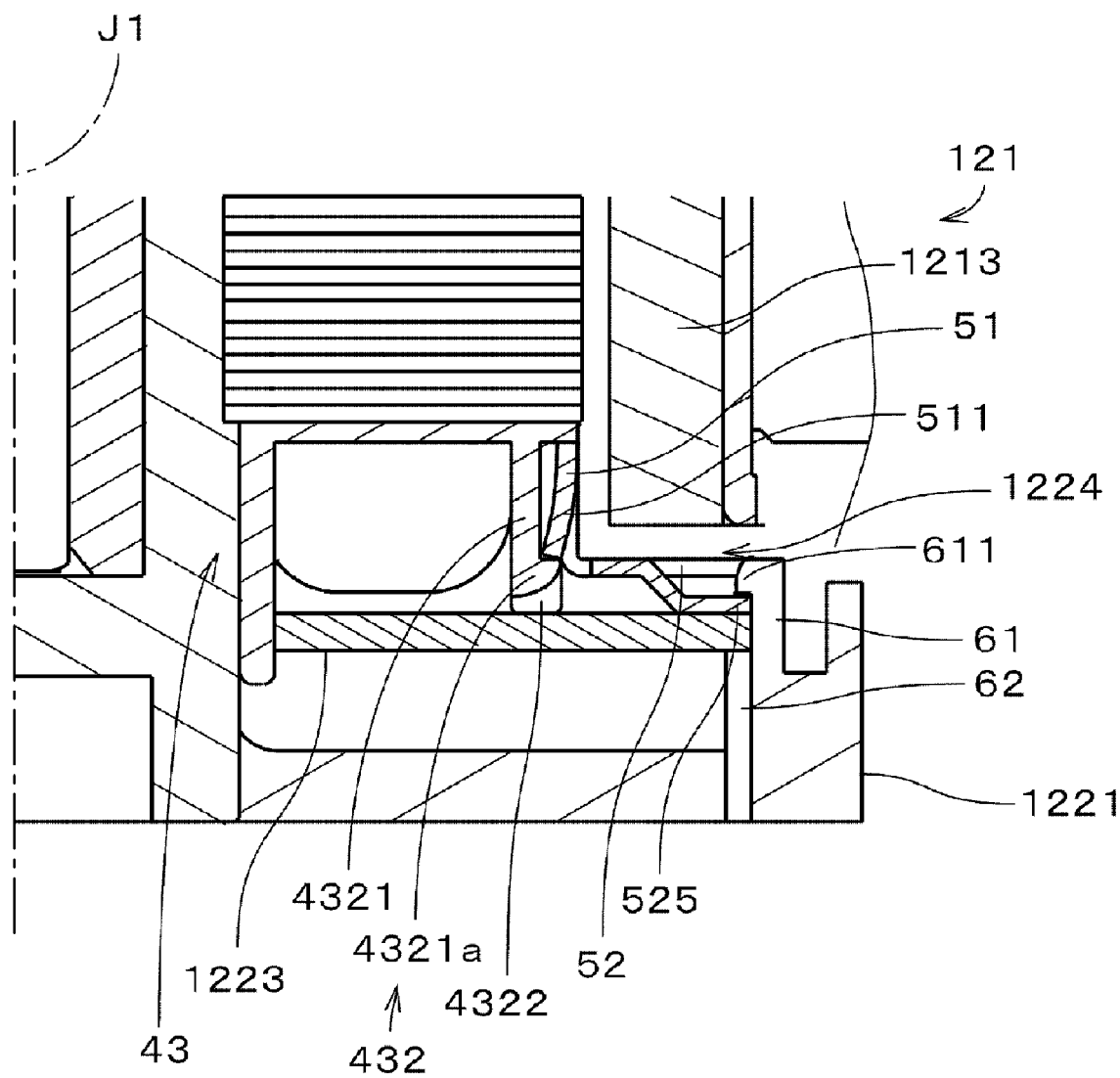
FIG. 17 is a partial sectional view of the motor.

FIG. 16 is a plan view showing still another preferred embodiment of the magnetic member 1224. FIG. 17 is a longitudinal cross-sectional view showing a state where the magnetic member 1224 shown in FIG. 16 is fitted with the lower insulator 43 and the base portion 1221. FIG. 17 also shows a portion of the back of the cross-section. A motor in which the magnetic member 1224 of FIG. 16 is provided is the same as the motor 12 of FIG. 1 excluding that the shapes of the magnetic member 1224, the lower insulator 43, and the base portion 1221 are slightly different from those of the motor 12, and the same reference signs are given to the corresponding constituent elements.

As shown in FIGS. 16 and 17, a convex portion 511 of the cylindrical portion 51 is gradually tilted so that its lower portion gets closer to the center axis J1 in the magnetic member 1224. At three positions of an outer peripheral portion of the flat portion 52 in the magnetic member 1224, a bent portion 525 is provided which is bent to be inclined downwardly and outwardly in the radial direction and has a flat tip end. A large notch 521 is provided in the flat portion 52.

As shown in FIG. 17, the tip end of the bent portion 525 contacts the upper surface of the printed wiring board 1223. The tip end of the bent portion 525 and an outer peripheral portion of the printed wiring board 1223 are fixed between the tip end 611 of the protrusion 61 of the base portion 1221 and the auxiliary protrusions 62.

Figure 18:
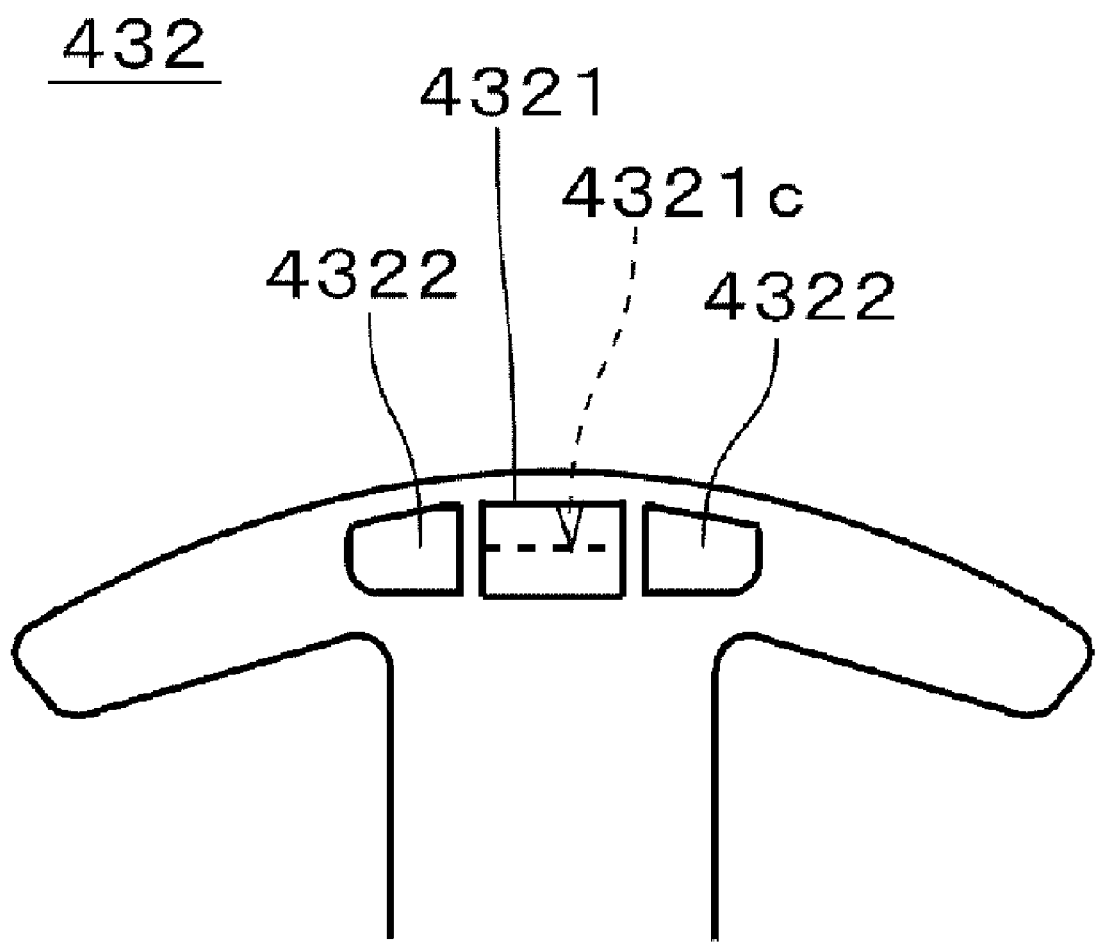
FIG. 18 is a bottom view of a tooth covering portion.

FIG. 18 is a bottom view showing one tooth covering portion 432 in the lower insulator 43. As shown in FIGS. 17 and 18, in the tooth covering portion 432, an outer circumferential surface 4321c of the protrusion 4321 which protrudes downwardly from the vicinity of a tip end of the tooth covering portion 432, is made slightly closer to the center axis J1 when compared with that shown in FIGS. 2 and 7. The cylindrical portion 51 of the magnetic member 1224 only contacts outer surfaces of the protrusions 4322 provided on the both sides of the protrusion 4321.

The convex portion 511 of the cylindrical portion 51 is preferably tilted and the outer circumferential surface 4321c of the protrusion 4321 of the lower insulator 43 is made close to the center axis J1. With this structure, the lower insulator 43 is inserted into the cylindrical portion 51 while the protrusions 4321 are hardly elastically deformed and only the convex portions 511 are elastically deformed.

After the lower insulator 43 is completely inserted into the cylindrical portion 51, the tip ends of the convex portions 511 move to positions which are closer to the center axis J1 than those of the tip ends 4321a of the protrusions 4321, and the position of the magnetic member 1224 in the direction of the center axis J1 is fixed. Thus, it is possible to easily insert the lower insulator 43 into the cylindrical portion 51.

As shown in FIG. 17, since the protrusion 4321 is designed to be shorter than the protrusions 4322, the upper surface of the printed wiring board 1223 contacts the lower end of the protrusions 4322 without contacting the protrusion 4321. As a result, the strength of the lower insulator 43 relative to the force inflicted by the printed wiring board 1223 during assembly can be ensured by the design of the thickness of the protrusions 4322. By minimizing the thickness of the protrusion 4321, the protrusion 4321 can be easily elastically deformed and the cylindrical portion 51 can be locked. That is to say, it is possible to design the lower insulator 43 easily by separating the function of the protrusion 4321 and the function of the protrusions 4322 in the lower insulator 43.

Further, it is possible to bring the flat portion 52 of the magnetic member 1224 close to the field magnet 1213 by providing the bent portion 525 while keeping a clearance between the protrusion 61 of the base portion 1221 and the rotor portion 121 as shown in FIG. 17. Since portions on both sides in the circumferential direction of the bent portion 525 in the flat portion 52, contact or are close to the protrusion 61, it is possible to prevent the magnetic member 1224 from rotating relatively to the base portion 1221 in the circumferential direction.

Also in the magnetic member 1224 shown in FIGS. 16 and 17, the protrusions 4321 of the lower insulator 43 are inserted into the cylindrical portion 51 of the magnetic member 1224. Therefore, it is possible to easily locate the flat portion 52 of the magnetic member 1224 close to the field magnet 1213. The magnetic member 1224 can be stably fitted with the lower insulator 43 by the protrusions 4321 with a simple structure, and the flat portion 52 can be easily kept horizontally while the center axis of the magnetic member 1224 is made to appropriately coincide with the center axis J1 of the motor 12. Since the number of the notch or the hole provided in the magnetic member 1224 may be substantially one (i.e., only one notch 521), the large area of the magnetic member 1224 can be maintained.

Second Preferred Embodiment

Figure 19:
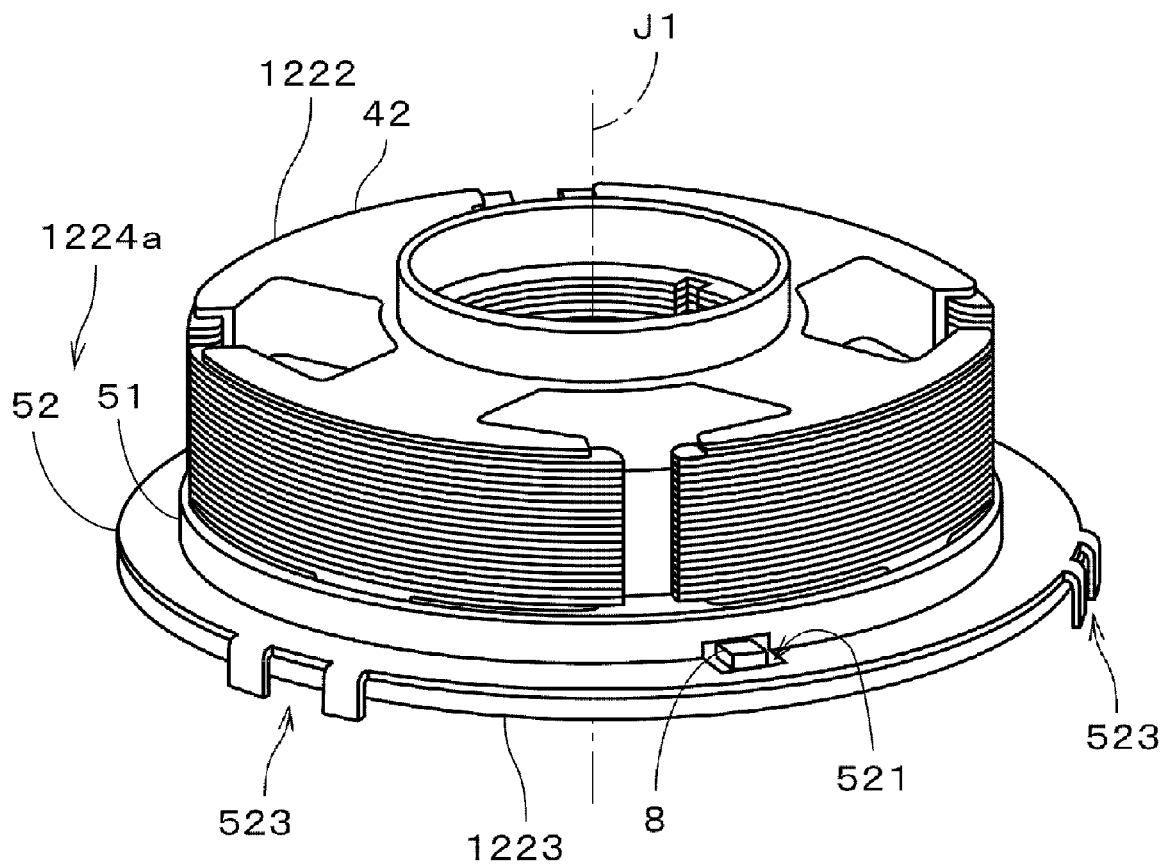
FIG. 19 is a perspective view of a stator, a printed wiring board, and a magnetic member according to a second preferred embodiment of the present invention.
Figure 20:
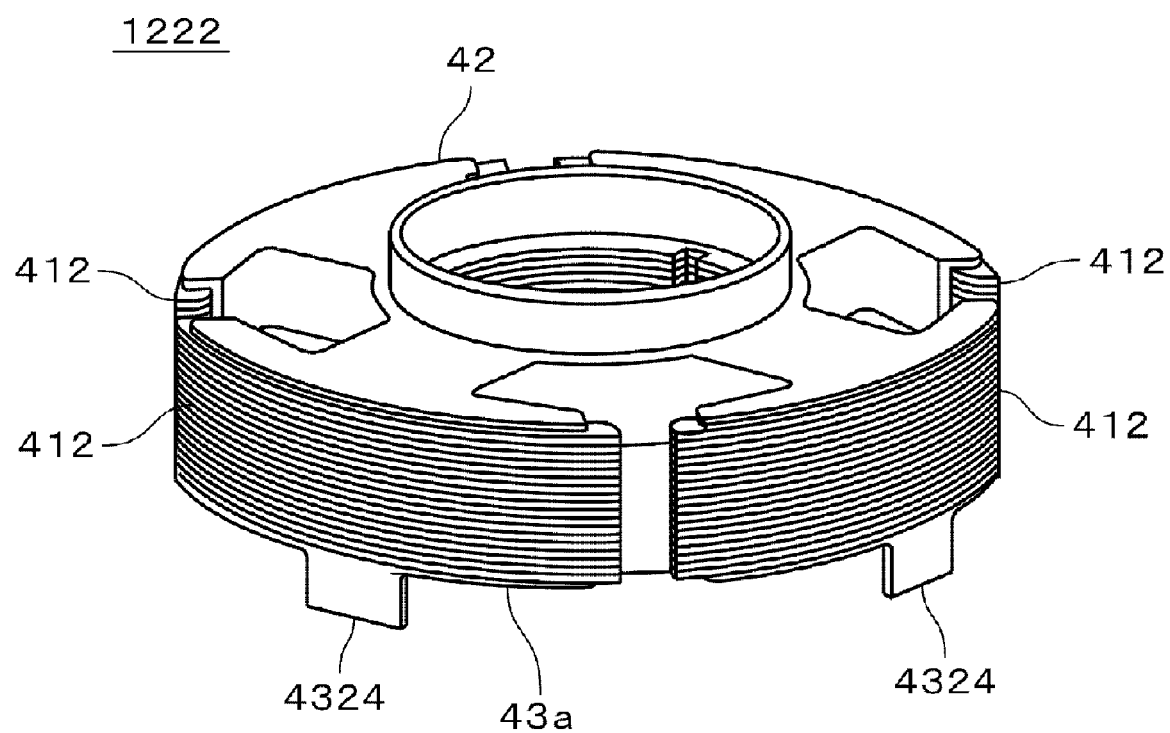
FIG. 20 is a perspective view of a stator.

FIG. 19 is a perspective view showing a stator 1222, a magnetic member 1224a, and a printed wiring board 1223 of an axial fan according to the second preferred embodiment. FIG. 20 is a perspective view of the stator 1222. In FIGS. 19 and 20, the shape of an upper insulator 42 of the stator 1222 is drawn simply.

As shown in FIG. 19 pairs of lug portions 523 are preferably provided at four positions in the circumferential direction in the outer circumference of the flat portion 52 at regular intervals in the magnetic member 1224a. The holes 53 shown in FIG. 4 are omitted in the magnetic member 1224a. One notch 521 is defined in the flat portion 52, and a portion of a lower end portion of the cylindrical portion 51 is cut out at the position where the notch 521 is provided. The rest of the magnetic member 1224a is the same as that of the magnetic member 1224, and the same reference signs are given to the same constituent elements.

As shown in FIG. 20, plate-shaped protrusions 4324 are provided in the lower insulator 43a of the stator 1222. The protrusions 4324 protrude downwardly from tip ends of four tooth portions 412, that is, protrude toward the base portion 1221 (see FIG. 1). Other construction of the lower insulator 43a is the same as that of the lower insulator 43 of FIG. 3. The tooth portions 412 slightly protrude to the outside of the lower insulator 43a in the radial direction.

In the axial fan, the protrusions 4324 of the lower insulator 43a shown in FIG. 20 are inserted into the cylindrical portion 51 of the magnetic member 1224a shown in FIG. 19, and the cylindrical portion 51 contacts outer surfaces of the protrusions 4324. The flat portion 52 of the magnetic member 1224a is preferably fixed to the printed wiring board 1223 by bending the lug portions 523 inwardly from the outer peripheral portion of the printed wiring board 1223.

FIG. 19 shows the lug portions 523 before bending. Insulating material such as insulating film, for example, is provided on the printed wiring board 1223, and the insulation between the magnetic member 1224a and the printed wiring board 1223 is secured. On the printed wiring board 1223, the hall element 8 is attached to the position corresponding to the notch 521 of the flat portion 52. The hall element 8 opposes the field magnet 1213 (see FIG. 1) of the rotor portion 121 through the notch 521.

As shown in FIG. 1, the stator 1222 is fixed to the outer circumference of the sleeve housing 1232, and the printed wiring board 1223 is positioned between the magnetic member 1224a and the base portion 1221.

In the axial fan according to the second preferred embodiment, the protrusions 61 of the base portion 1221 are preferably omitted and the magnetic member 1224a is fixed to only the printed wiring board 1223. The rest of the axial fan excluding the magnetic member 1224a, the lower insulator 43a, and the base portion 1221 is the same as that of the axial fan 1 according to the first preferred embodiment.

Figure 21:
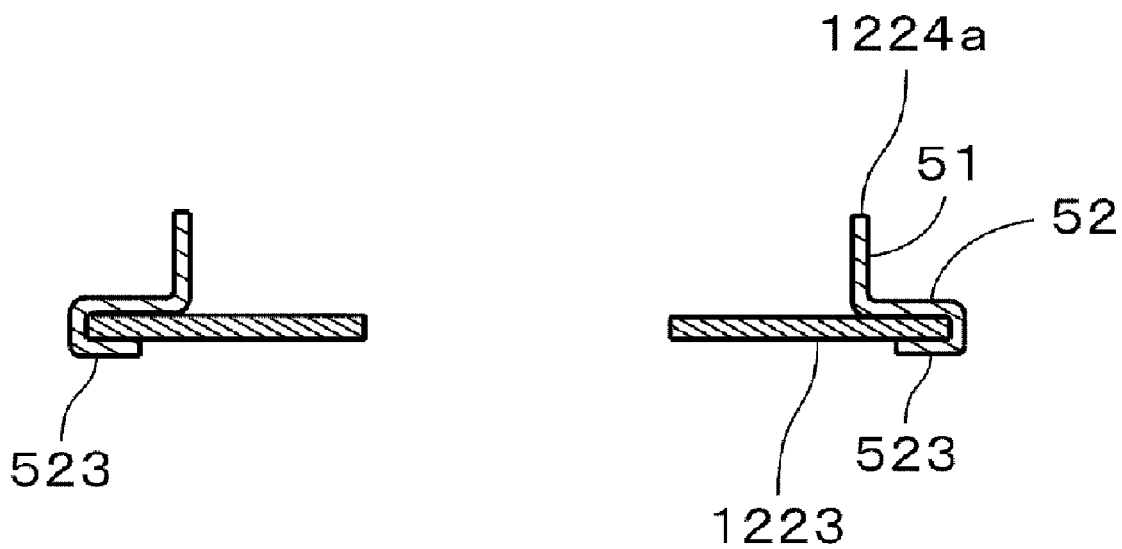
FIG. 21 is a cross-sectional view of the printed wiring board and the magnetic member.
Figure 22:
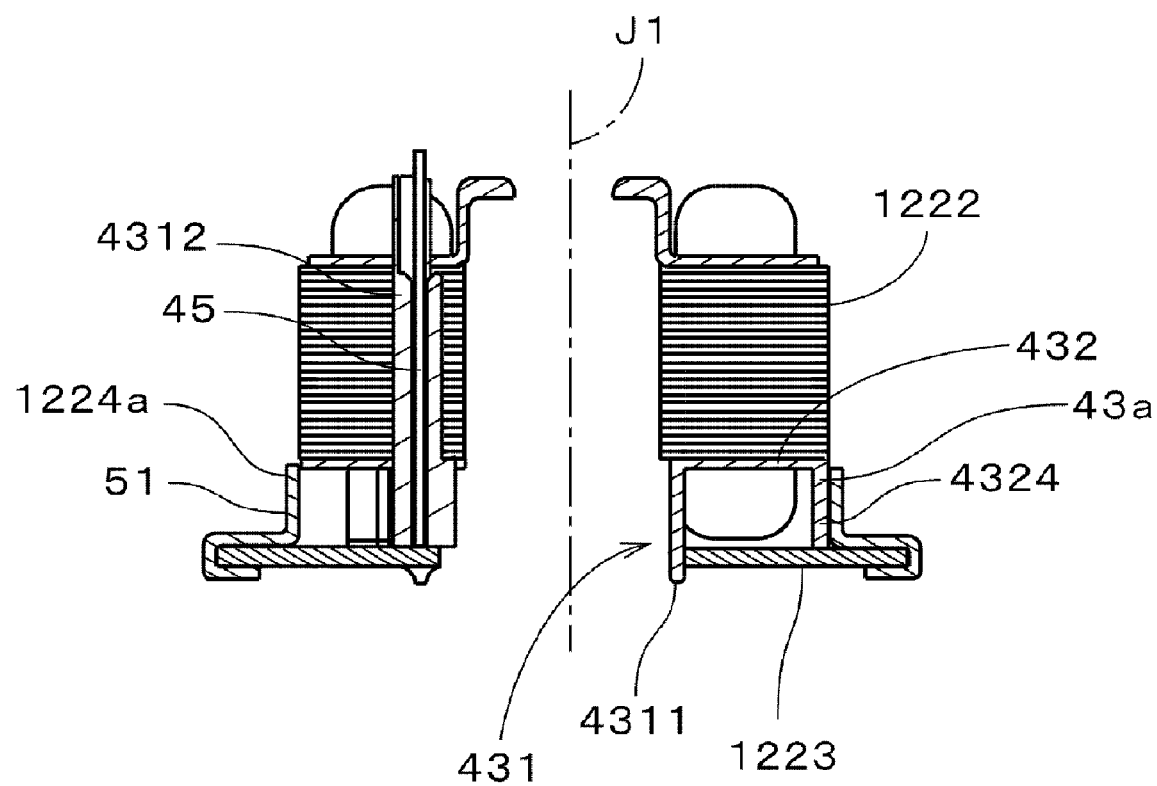
FIG. 22 is a cross-sectional view of the stator, the printed wiring board, and the magnetic member.

FIG. 21 is a view showing a state where the magnetic member 1224a is fixed to the printed wiring board 1223. FIG. 22 is a view showing a state where the magnetic member 1224a and the printed wiring board 1223 are fixed to the stator 1222.

When the magnetic member 1224a is fixed to the printed wiring board 1223 and the stator 1222, first, the printed wiring board 1223 shown in FIG. 21 is located inside the flat portion 52 of the magnetic member 1224a. The lower surface of the flat portion 52 contacts the upper surface of the printed wiring board 1223, and the lug portions 523 project lower than the printed wiring board 1223. The lug portions 523 of the magnetic member 1224a are bent inwardly to contact with the lower surface of the printed wiring board 1223, and the magnetic member 1224a is fixed to the printed wiring board 1223.

The magnetic member 1224a and the printed wiring board 1223 are preferably positioned below the stator 1222 (see FIG. 20) so that the center axis of the magnetic member 1224a and the center axis J1 of the stator 1222 coincide with each other. Then, the magnetic member 1224a and the printed wiring board 1223 are put on the stator 1222. With this assembly, as shown in FIG. 22, the inner circumferential surface and the upper surface of the printed wiring board 1223 respectively contact with the outer circumferential surface of the protrusion 4311 of the annular portion 431 of the lower insulator 43a and the lower ends of the protrusions 4324 of the tooth covering portions 432. In a state where the cylindrical portion 51 of the magnetic member 1224a contacts the protrusions 4324 of the lower insulator 43a, the protrusions 4324 are inserted into the cylindrical portion 51. The pins 45 inserted in the pin inserting portions 4312 of the stator 1222 are inserted into the printed wiring board 1223 to be connected with the printed wiring board 1223 at the lower surface of the printed wiring board 1223. Thus, the relative positions of the printed wiring board 1223 and the stator 1222 are fixed.

Through the above operation, the magnetic member 1224a is fixed to the lower insulator 43a with the printed wiring board 1223 interposed therebetween. An assembly of the stator 1222, the printed wiring board 1223, and the magnetic member 1224a is attached to the base portion 1221 by inserting the sleeve portion 123 (see FIG. 1) fixed to the base portion 1221 (see FIG. 1) into the stator 1222.

Also in the axial fan according to the second preferred embodiment, the cylindrical portion 51 and the flat portion 52 of the magnetic member 1224a respectively oppose the field magnet 1213 (see FIG. 1) in the direction perpendicular or substantially perpendicular to the center axis J1 and the direction parallel or substantially parallel to the center axis J1. Since the protrusions 4324 of the lower insulator 43a are inserted into the cylindrical portion 51, it is possible to easily locate the flat portion 52 close to the field magnet 1213. By making the flat portion 52 close to the field magnet 1213, a large magnetic attractive force can be easily generated between the magnetic member 1224a and the field magnet 1213.

The flat portion 52 is fixed to the printed wiring board 1223 and therefore the magnetic member 1224a is stably fixed to the stator 1222. The magnetic member 1224a is held to contact with the printed wiring board 1223. Thus, the size of the axial fan in the direction of the center axis J1 is made smaller and vibration of the magnetic member 1224a is minimized.

Since the cylindrical portion 51 contacts the outer surfaces of the protrusions 4324, the flat portion 52 can easily be kept horizontally while the center axis of the magnetic member 1224a is made to appropriately coincide with the center axis J1 of the axial fan 1 and the motor 12. The magnetic member 1224a can be stably fitted with the lower insulator 43a by the protrusions 4324 with a simple structure. Since the number of the notch 521 provided in the flat portion 52 may be one in the magnetic member 1224a, it is possible to decrease a loss of magnetic attractive force generated between the field magnet 1213 and the magnetic member 1224a.

Third Preferred Embodiment

Figure 23:
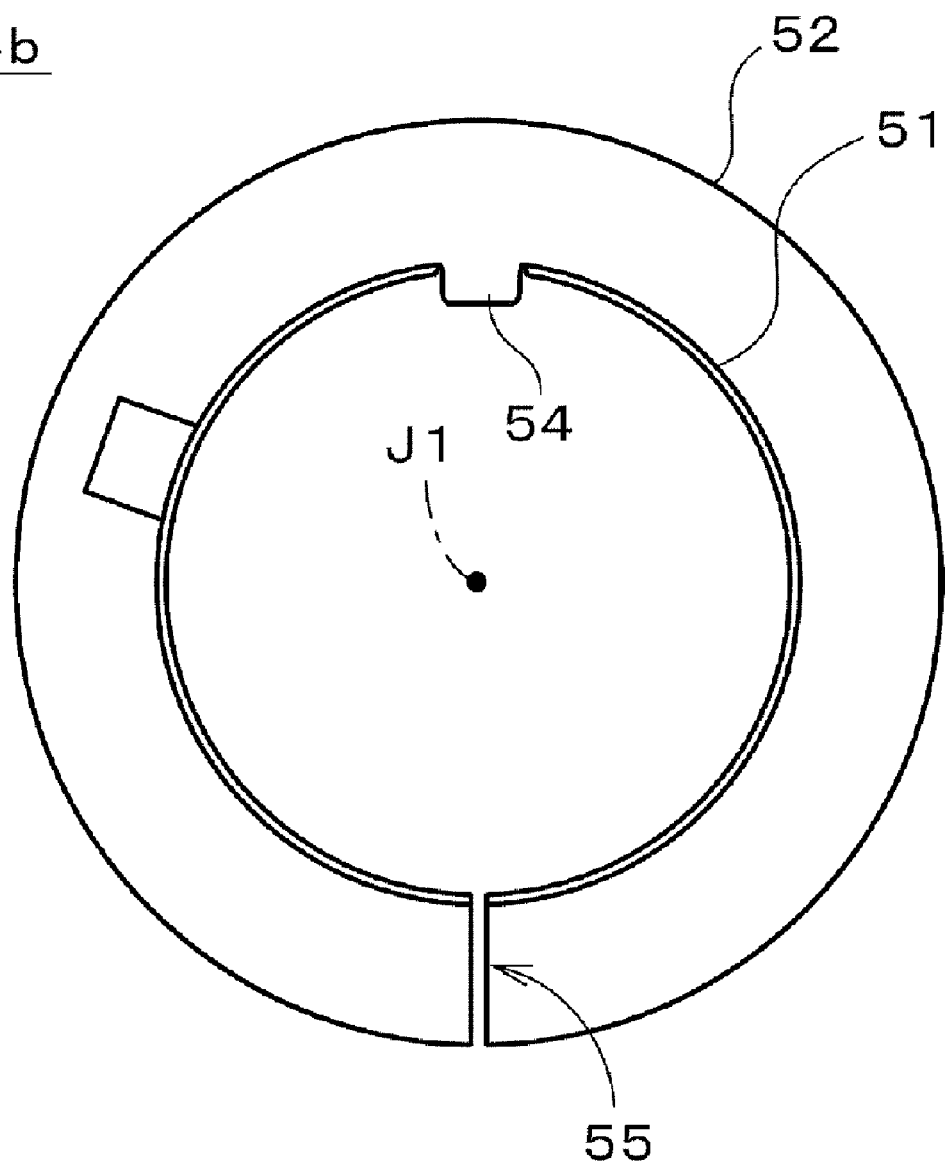
FIG. 23 is a plan view of a magnetic member in an axial fan according to a third preferred embodiment of the present invention.

FIG. 23 is a plan view showing a magnetic member 1224b in an axial fan according to the third preferred embodiment. In the magnetic member 1224b, the holes 53 of the magnetic member 1224 shown in FIG. 4 are omitted. An upper portion of a cylindrical portion 51 in FIG. 23 is cut out, and a portion of a flat portion 52 projects inwardly in the radial direction. In the following description, the portion of the flat portion 52 is referred to as a "projected portion 54". On the opposite side of the projected portion 54 in the circumferential direction, i.e., on the lower side of FIG. 23, a slit 55 extending across the magnetic member 1224b in the radial direction is provided. The rest of the magnetic member 1224b is almost the same as that of the magnetic member 1224.

Figure 24:
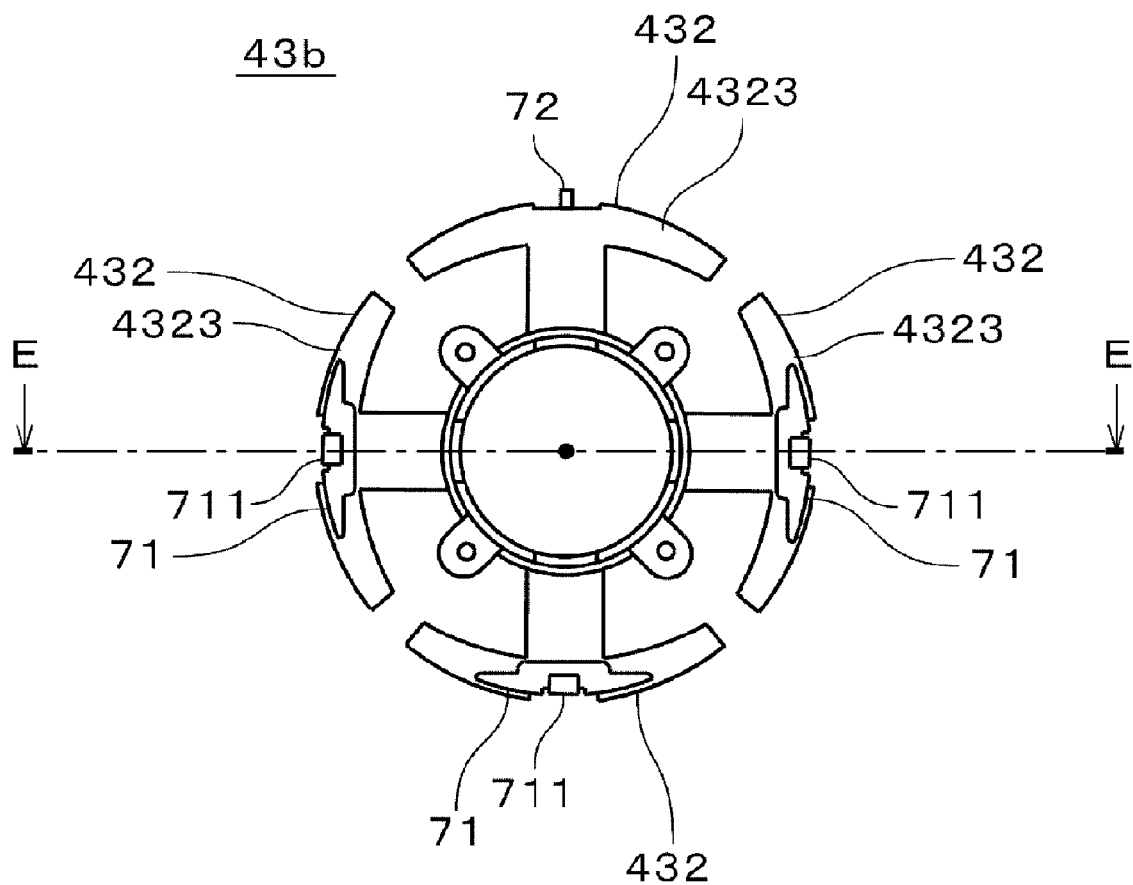
FIG. 24 is a bottom view of a lower insulator.

FIG. 24 is a bottom view of a lower insulator 43b. Protrusions 71 are provided in tooth covering portions 432 which are located on the left, right, and lower side of FIG. 24. In a tooth covering portion 432 located on the upper side of FIG. 24, a cylindrical small protrusion 72 protruding outwardly in the radial direction from the outer circumferential surface of the tooth covering portion 432 is provided instead of the protrusion 71. The other shape of the lower insulator 43b is the same as that of the lower insulator 43 shown in FIG. 2. In the axial fan according to the third preferred embodiment, the arrangement excluding the magnetic member 1224b and the lower insulator 43b is the same as that of the axial fan 1 according to the first preferred embodiment, and the same reference signs are given to the same constituent elements.

Figure 25:
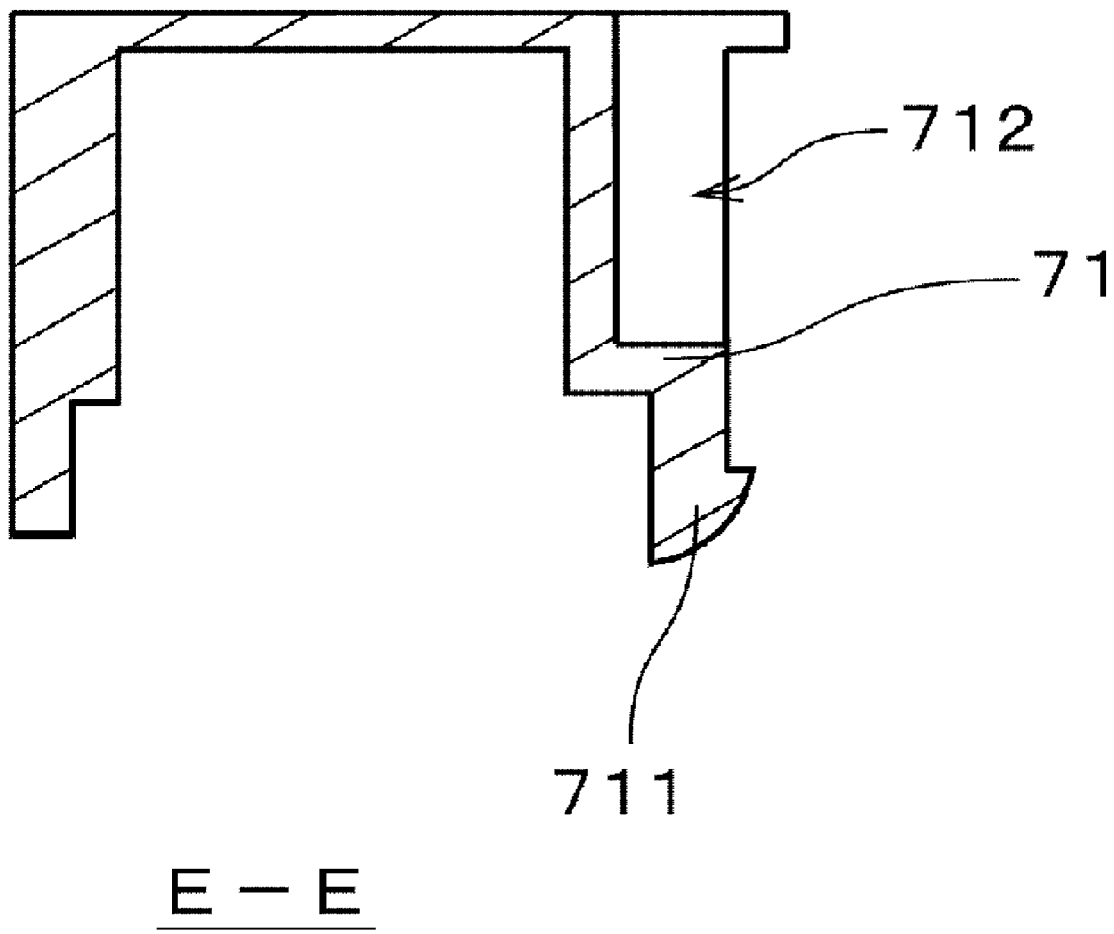
FIG. 25 is a cross-sectional view of the lower insulator.

FIG. 25 is a cross-sectional view of the right protrusion 71 in the positions indicated by arrows E in FIG. 24, and also shows a portion of the back of the cross section. As shown in FIGS. 24 and 25, the protrusion 71 extends downwardly, and a bar-shaped tip end portion 711 which further protrudes downwardly is provided at the center of the protrusion 71. As shown in FIG. 25, a groove 712 extending upwardly on the upper side of the tip end portion 711 is formed in the protrusion 71.

Figure 26:
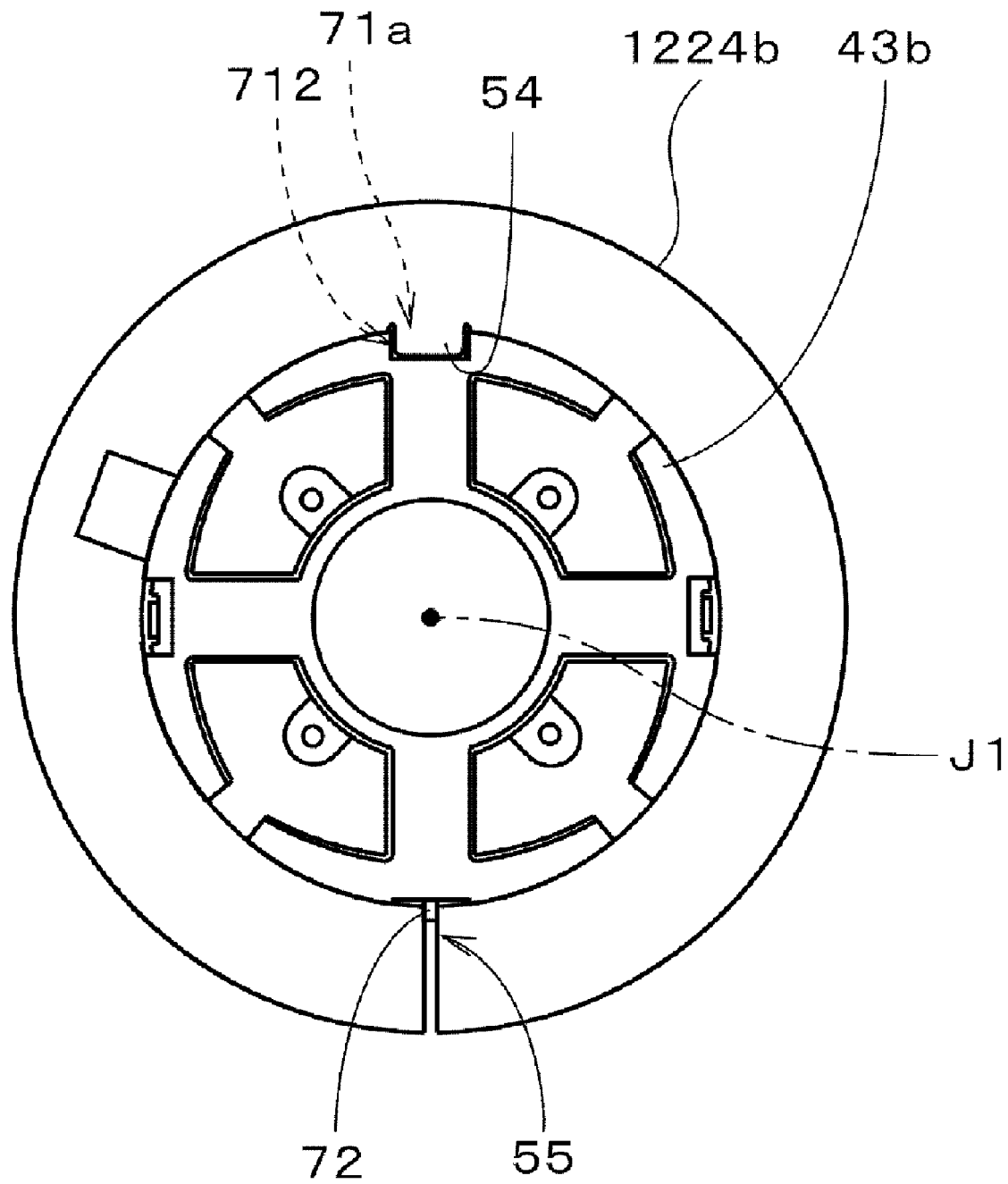
FIG. 26 is a plan view of the lower insulator to which the magnetic member is fixed.
Figure 27:
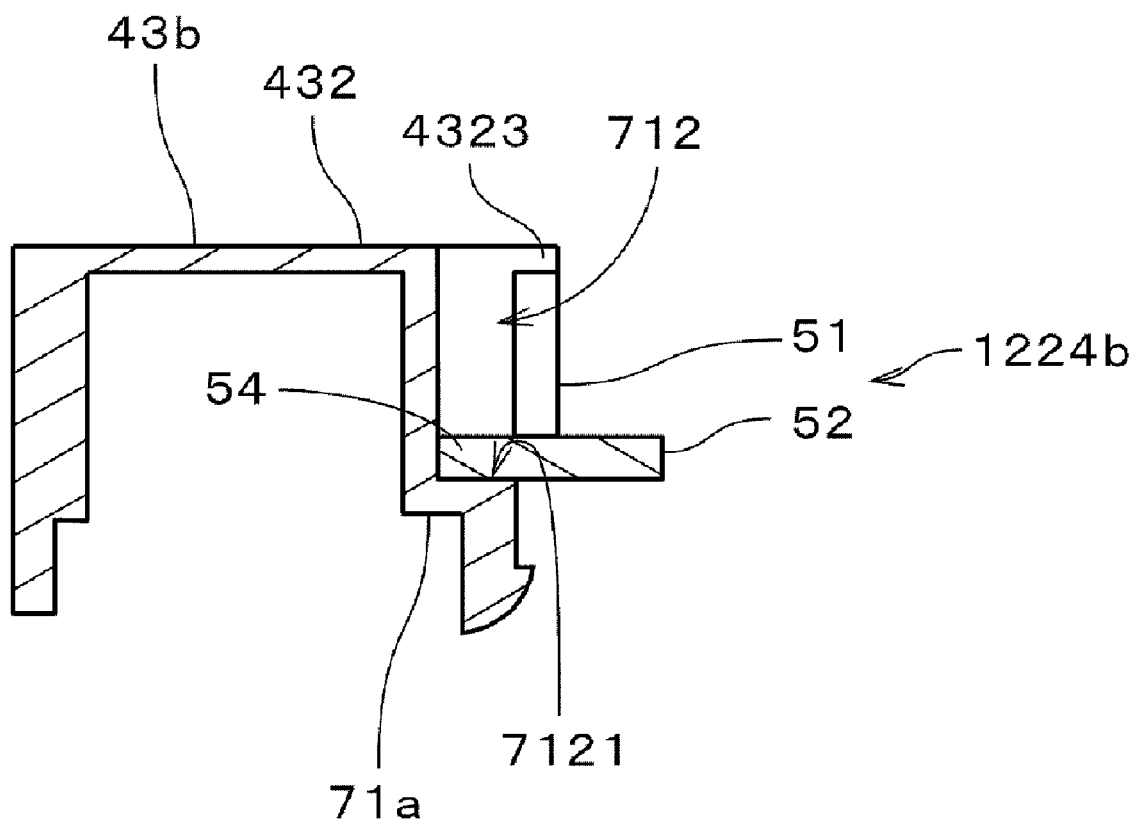
FIG. 27 is a cross-sectional view of the lower insulator and the magnetic member.

FIG. 26 is a plan view showing the lower insulator 43b to which the magnetic member 1224b is attached. FIG. 27 is a cross-sectional view of the magnetic member 1224b and the lower insulator 43b which are sectioned in the vicinity of the projected portion 54 of the magnetic member 1224b shown in FIG. 26. In the actual FIG. 26, the stator core 41 (see FIG. 1) and the like are disposed above the lower insulator 43b. The projected portion 54 of the magnetic member 1224b is positioned within the groove 712 of a protrusion 71a shown in FIG. 27, and the projected portion 54 is engaged with the groove 712 in the circumferential direction. As shown in FIG. 27, the projected portion 54 contacts a bottom surface 7121 of the groove 712 which extends upward.

The cylindrical portion 51 contacts the outer surface of the protrusion 71a, and the upper end of the cylindrical portion 51 contacts the lower surface of an outer peripheral portion 4323 of the tooth covering portion 432. Similarly, the cylindrical portion 51 contacts the right and left protrusions 71 in FIG. 24, and the upper end of the cylindrical portion 51 contacts the lower surfaces of the outer peripheral portions 4323 of the tooth covering portions 432 which are located on the left, right, and upper sides.

Figure 28:
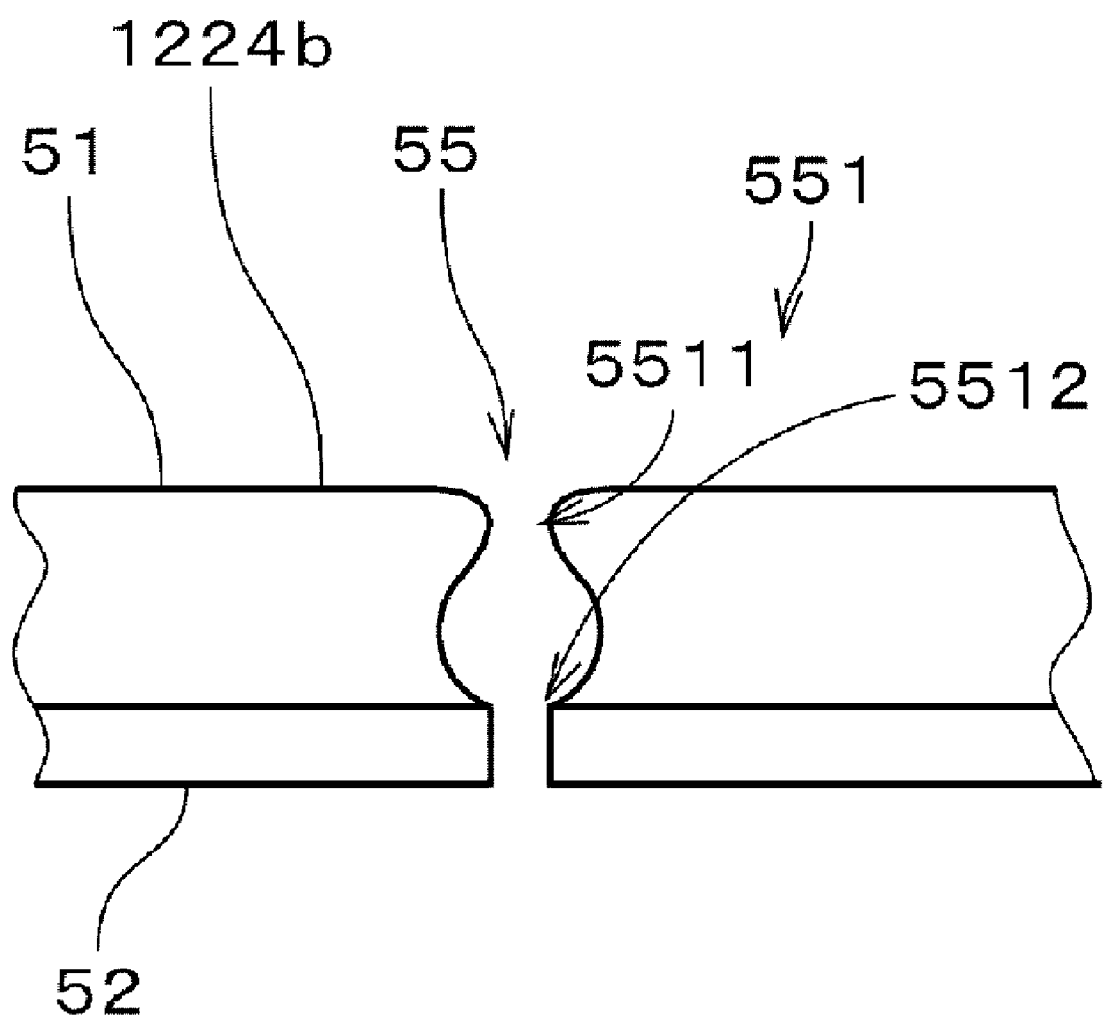
FIG. 28 is a view showing a slit of the magnetic member when viewed from the outside in a radial direction.

FIG. 28 is a view showing the slit 55 of the magnetic member 1224b shown in FIG. 23 when viewed from the outside in the radial direction. In a portion extending in parallel or substantially in parallel with the center axis J1 (see FIG. 23) of the slit 55, the width in the circumferential direction (horizontal direction in FIG. 28) of a lower portion 5512 is preferably made smaller than the diameter of the small protrusion 72 of the lower insulator 43b shown in FIG. 24. Edges of a portion between an upper portion 5511 and the lower portion 5512 are made in a substantially arched shape whose diameters are almost equal to that of the small protrusion 72. Hereinafter, the portion extending in parallel or substantially in parallel with the center axis J1 of the slit 55 is referred to as an "axial direction slit 551". The lower portion 5512 is located between the upper portion 5511 and the cylindrical portion 51 and the flat portion 52.

The width in the circumferential direction of the slit 55 in the flat portion 52 is made equal or substantially equal to that of the lower portion 5512 of the axial direction slit 551.

Figure 29:
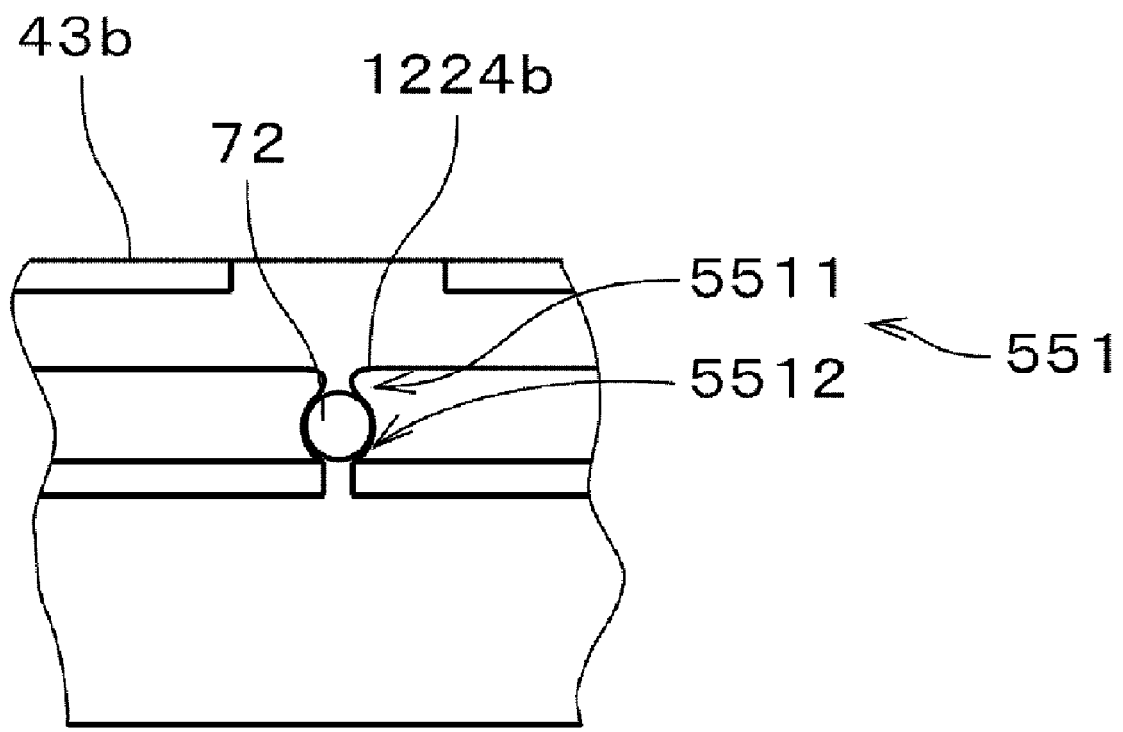
FIG. 29 is a view showing a small protrusion of the lower insulator and the slit of the magnetic member when viewed from the outside in the radial direction.

FIG. 29 is a view showing the vicinity of the small protrusion 72 of the lower insulator 43b as viewed from the outside in the radial direction, in a state where the magnetic member 1224b is fixed to the lower insulator 43b. The small protrusion 72 is located between the upper portion 5511 and the lower portion 5512 of the axial direction slit 551, and engaged with the axial direction slit 551 in the circumferential direction and the direction parallel or substantially in parallel to the center axis J1.

As discussed above, the small protrusion 72 and the groove 712 of the protrusion 71a of the lower insulator 43b shown in FIG. 26 are engaged with the slit 55 and the projected portion 54 of the magnetic member 1224b, respectively, in the circumferential direction. With this structure, the position of the magnetic member 1224b in the circumferential direction relative to the lower insulator 43b is fixed. Further, the small protrusion 72 and the slit 55 are engaged with each other in the direction parallel or substantially in parallel to the center axis J1. As shown in FIG. 27, the projected portion 54 contacts the bottom surface 7121 of the groove 712, and the upper end of the cylindrical portion 51 contacts the outer peripheral portions 4323 of the tooth covering portions 432. Thus, the position of the magnetic member 1224b in the direction parallel or substantially in parallel to the center axis J1 is fixed.

When the magnetic member 1224b is fixed to the lower insulator 43b, the stator 1222 is preferably prepared in advance. Specifically, the stator 1222 is preferably prepared by attaching the upper insulator 42 and the lower insulator 43b (see FIG. 24) to the stator core 41 (see FIG. 1) and winding conductive wires around the stator core 41 together with both insulators.

Figure 30:
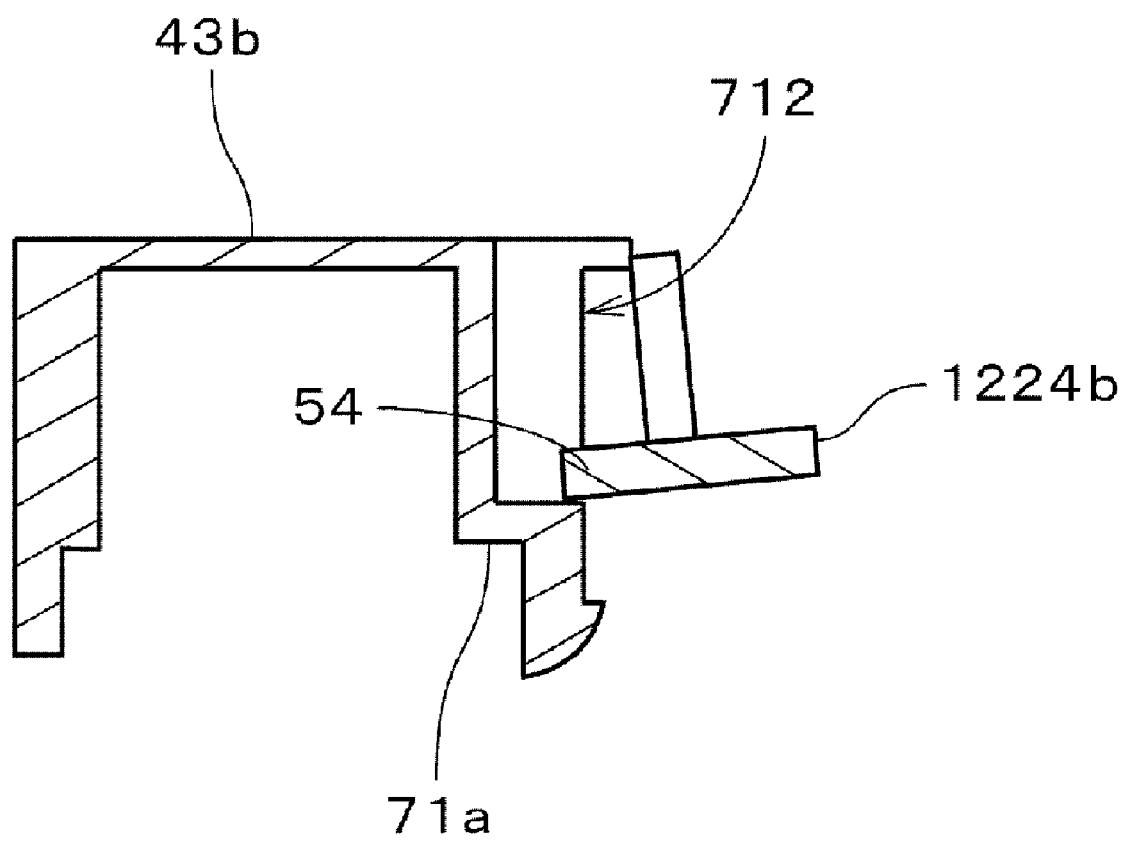
FIG. 30 is a cross-sectional view of the lower insulator and the magnetic member.

As shown in FIG. 30, the tip end of the projected portion 54 of the magnetic member 1224b is inserted toward the groove 712 of the protrusion 71a from the outside in the radial direction of the lower insulator 43b in a state where the magnetic member 1224b is tilted relatively to the lower insulator 43b. At this time, the slit 55 of the magnetic member 1224b shown in FIG. 23 is located below the small protrusion 72 of the lower insulator 43b shown in FIG. 24 (i.e., located on the front side when viewed on the paper in FIG. 24).

Figure 31:
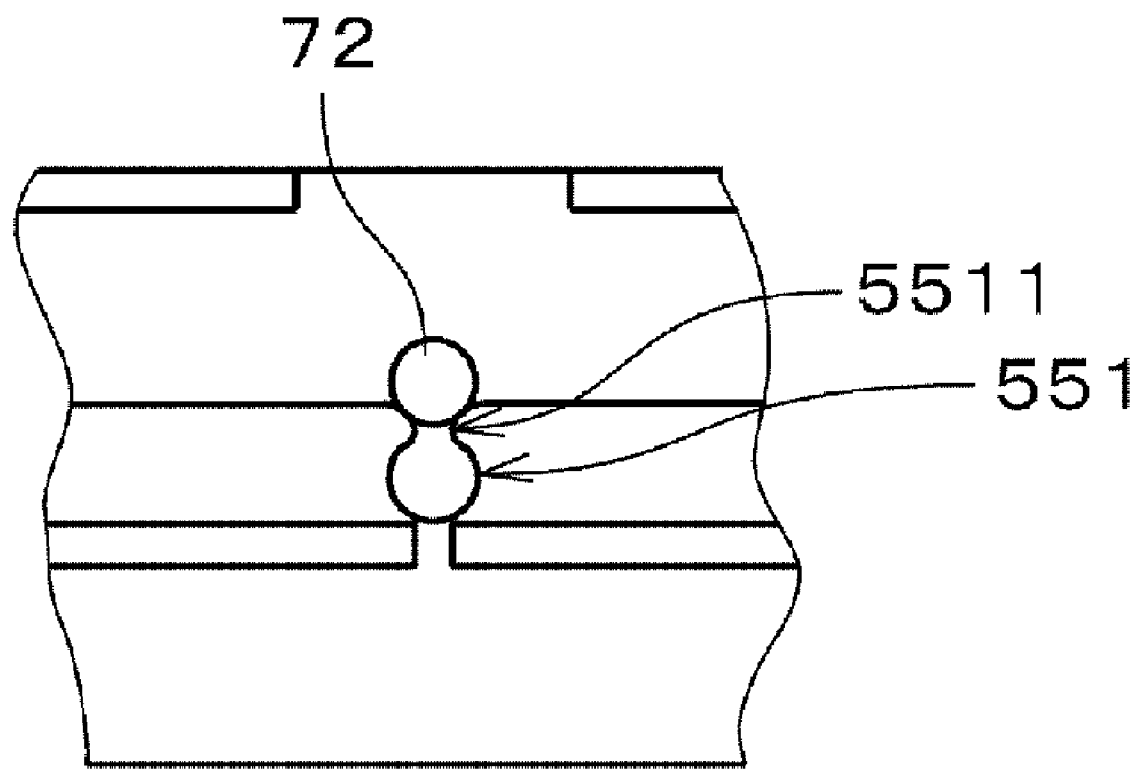
FIG. 31 is a view showing the small protrusion and the magnetic member when viewed from the outside in the radial direction.

Next, the slit 55 is moved toward the small protrusion 72, the upper portion 5511 of the axial direction slit 551 contacts the small protrusion 72 to be temporarily extended in the circumferential direction slightly, as shown in FIG. 31. As shown in FIG. 29, the small protrusion 72 is located between the upper portion 5511 and the lower portion 5512 of the axial direction slit 551.

Concurrently with locating the small protrusion 72 within the axial direction slit 551, the flat portion 52 of the magnetic member 1224b becomes perpendicular or substantially perpendicular to the center axis of the lower insulator 43b, and the projected portion 54 is engaged with the groove 712 in the circumferential direction, as shown in FIG. 27. The inner circumferential surface of the cylindrical portion 51 contacts the outer circumferential surfaces of the protrusions 71, 71a and the upper end of the cylindrical portion 51 contacts the outer peripheral portions 4323 of the tooth covering portions 432. As a result, the protrusions 71, 71a (see FIG. 24) of the lower insulator 43b are inserted into the cylindrical portion 51 (see FIG. 23) of the magnetic member 1224b.

As discussed above, in the axial fan according to the third preferred embodiment, fixing the magnetic member 1224b to the lower insulator 43b can be easily performed by using the elastic deformation of the magnetic member 1224b to thereby efficiently assemble the axial fan.

Also in the third preferred embodiment, the magnetic member 1224b is preferably fixed to the lower insulator 43b in a state where the protrusions 71 which are lower end portions of the lower insulator 43b, the lower end portions being a portion of an outer portion in the radial direction of the lower insulator 43b and opposing the base portion 1221 (see FIG. 1), are inserted into the cylindrical portion 51 of the magnetic member 1224b. Therefore, it is possible to easily locate the magnetic member 1224b close to the field magnet 1213. A large magnetic attractive force can be generated between the magnetic member 1224b and the field magnet 1213. As a result, even in a large-sized axial fan or the like, the relative position of the rotor portion 121 to the stator portion 122 is fixed. Since the magnetic member 1224b contacts the outer surfaces of the protrusions 71 of the lower insulator 43b, it is possible to easily keep the flat portion 52 of the magnetic member 1224b positioned horizontally.

In the third preferred embodiment, fixing the magnetic member 1224b to the lower insulator 43b is achieved by the slit 55 and the projected portion 54. Thus, the shape of the magnetic member 1224b is simplified and the cost of press dies that are preferably used in forming the magnetic member 1224b can be reduced. The shape of the lower insulator 43b is also simplified. The magnetic member 1224b has a structure where the projected portion 54 is fitted with the groove 712 of the lower insulator 43b and the small protrusion 72 of the lower insulator 43b is fitted with the slit 55. With this structure, it is possible to prevent mistakes of the attachment position in the circumferential direction of the magnetic member 1224b relative to the lower insulator 43b.

In the magnetic member 1224b, there may be a case where a projected portion which is the same shape as the projected portion 54 is provided on one side or both sides in the circumferential direction of the projected portion 54, and the above projected portion is located within either one of grooves 712 provided in the protrusions 71 other than the protrusion 71a, to thereby fix the position of the magnetic member 1224b in the circumferential direction. The slit 55 may be provided only in the cylindrical portion 51 in the magnetic member 1224b. The shape of the small protrusion 72 when viewed from the outside in the radial direction may be other than a circle, e.g., may be a rhombus.

Other Preferred Embodiments

Though three preferred embodiments of the present invention have been discussed above, the present invention is not limited to the above-discussed preferred embodiments, but allows various variations.

Figure 32:
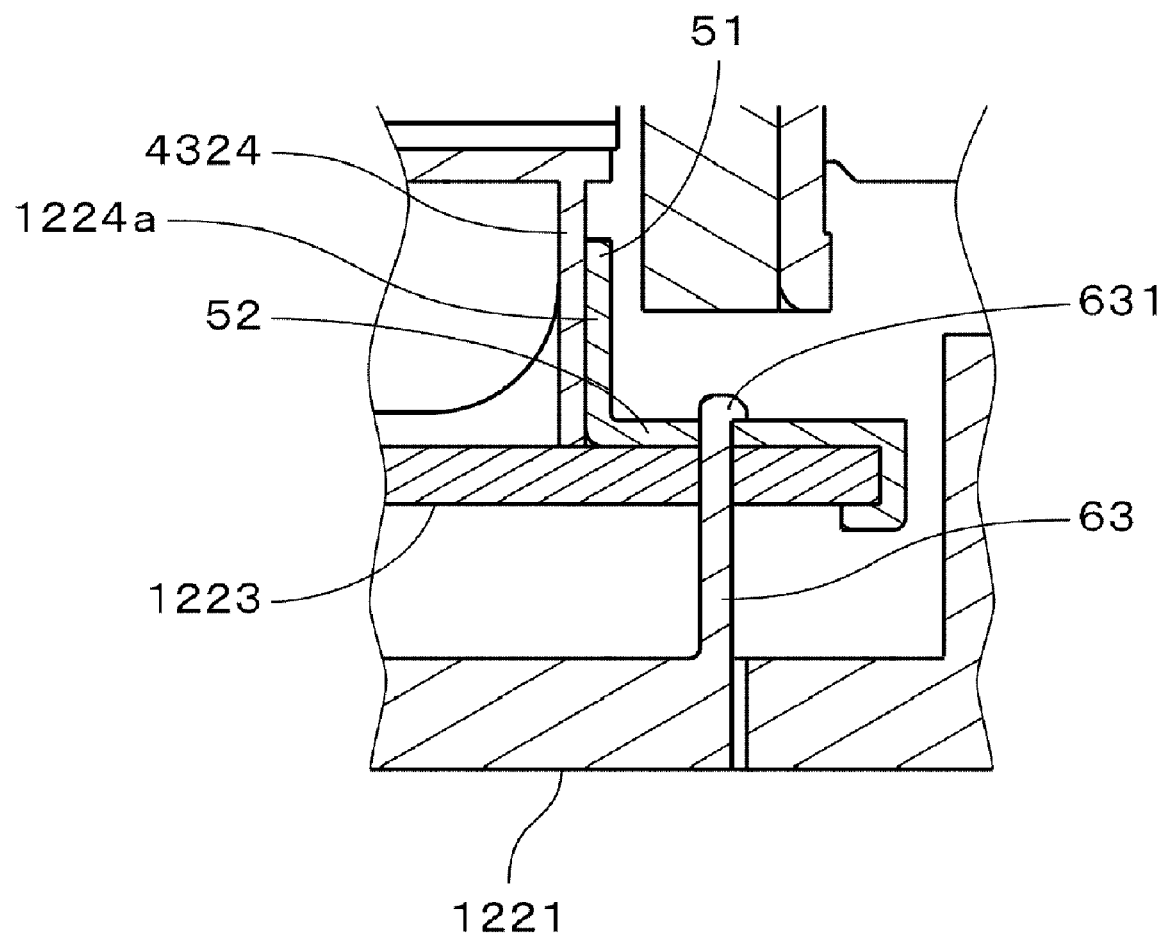
FIG. 32 is a cross-sectional view of a motor according to another example.

For example, in the above second preferred embodiment, protrusions 63 which extend upward in parallel or substantially in parallel with the center axis J1 (see FIG. 1) are provided in the base portion 1221, the flat portion 52 of the magnetic member 1224a may be fixed by the protrusions 63 in the direction parallel or substantially parallel to the center axis J1, as shown in FIG. 32. In FIG. 32, the protrusion 63 has a tip end 631 extending outwardly in the radial direction, and the protrusion 63 penetrates the printed wiring board 1223 and the flat portion 52. The lower surface of the tip end 631 contacts the upper surface of the flat portion 52 to engage the protrusion 63 with the flat portion 52. With this operation, it is possible to stably fix the magnetic member 1224a. Further, the protrusions 4321 shown in FIG. 7 may be provided instead of the protrusions 4324. The protrusions 4321 are engaged with the cylindrical portion 51 of the magnetic member 1224a in the direction parallel or substantially parallel to the center axis J1, and the lower insulator 43a and the magnetic member 1224a may thus be fixed.

Figure 33:
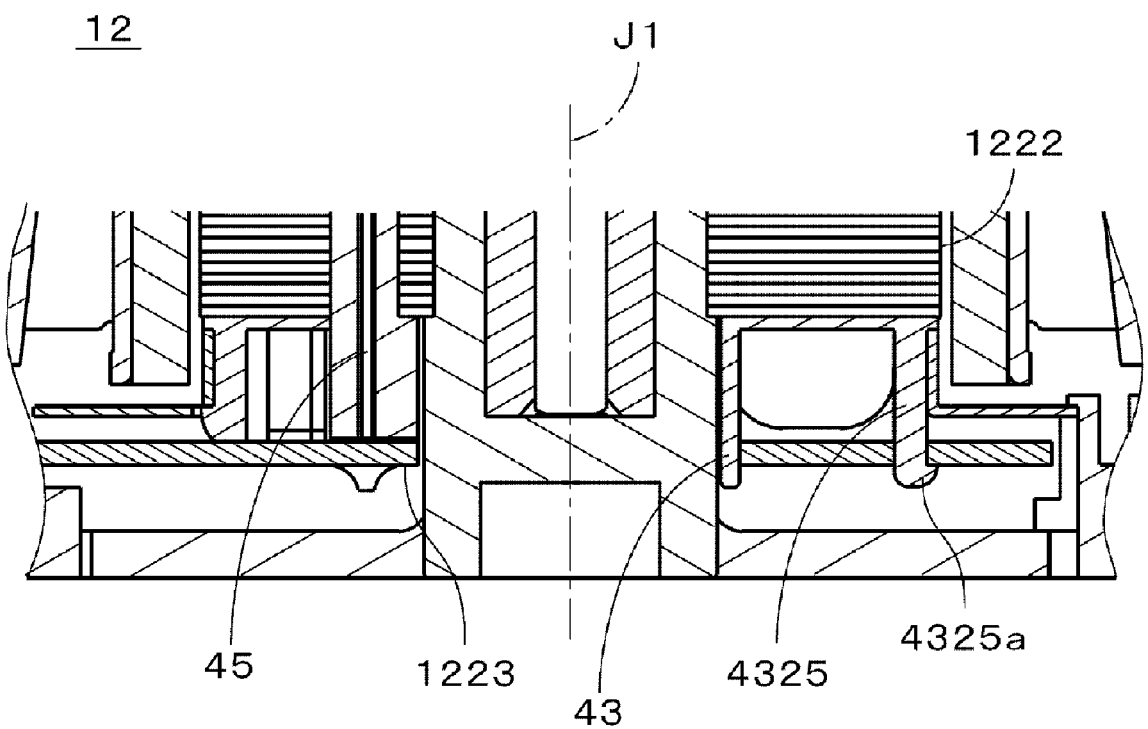
FIG. 33 is a cross-sectional view of a motor according to still another example.

In the above first preferred embodiment, protrusions 4325 which extend downwardly and penetrate the printed wiring board 1223 are provided in the lower insulator 43 as shown in FIG. 33. The position of the printed wiring board 1223 may be fixed relatively to the stator 1222 by the engagement between the protrusions 4325 and the printed wiring board 1223 in the direction parallel or substantially parallel to the center axis J1 and the joint of the printed wiring board 1223 and the pins 45. A tip end 4325a of the protrusion 4325 protrudes outwardly in the radial direction, and the upper surface of the tip end 4325a contacts the lower surface of the printed wiring board 1223. The printed wiring board 1223 and the stator 1222 may be fixed only by the protrusions 4325 as long as the stator 1222 and the printed wiring board 1223 are electrically connected by techniques other than the technique using the pins 45.

Figure 34:
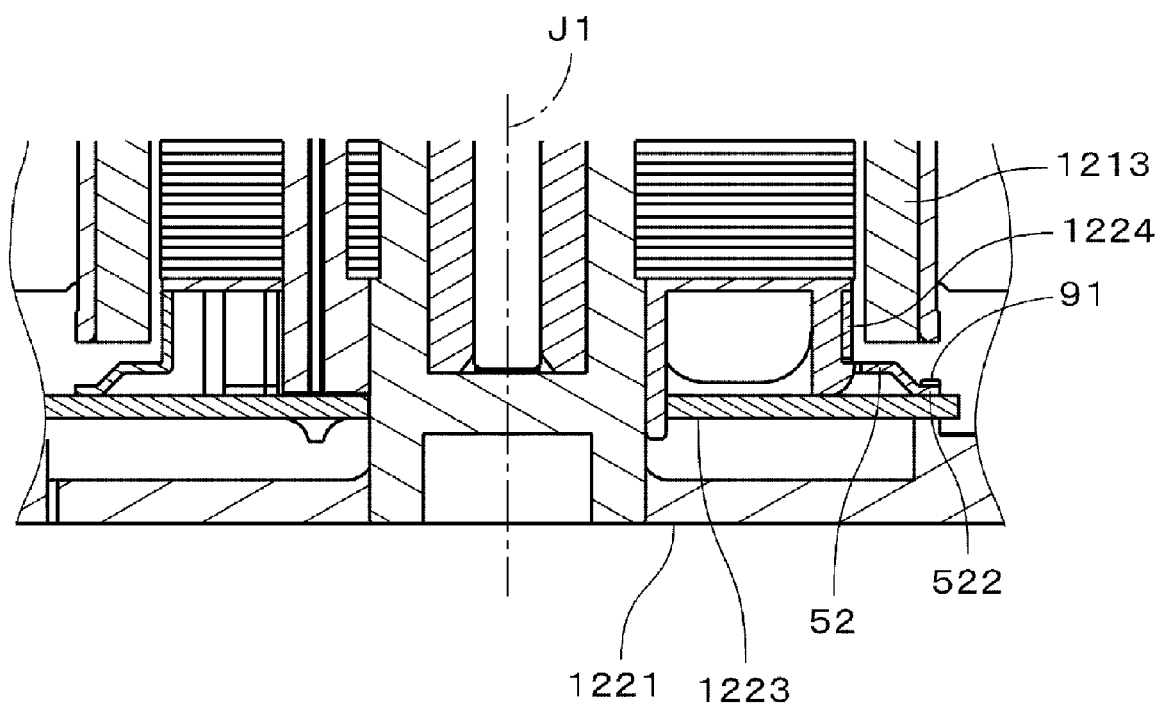
FIG. 34 is a cross-sectional view of a motor according to still another example.

In the above first preferred embodiment, as shown in FIG. 34, the magnetic member 1224 may be fixed to the base portion 1221 by screws 91, for example, between the magnetic member 1213 and the base portion 1221. The flat portion 52 of the magnetic member 1224 is bent between an inner portion and an outer peripheral portion 522 as to be tilted downwardly. The outer peripheral portion 522 contacts the upper surface of the printed wiring board 1223, and is fixed to the base portion 1221 by the screws 91 in the direction parallel or substantially parallel to the center axis J1, together with the printed wiring board 1223. Similarly, the magnetic member 1224a in the second preferred embodiment may be fixed to the base portion 1221 by screws.

In the magnetic member 1224a according to the second preferred embodiment, the magnetic member 1224a and the printed wiring board 1223 may be fixed by bending a portion of the outer peripheral portion 522 of the flat portion 52 shown in FIG. 19 toward the printed wiring board 1223. Further, the magnetic member 1224a may be fixed to the printed wiring board 1223 by adhesion, press fitting, screws, or the like. The magnetic member 1224 in the first preferred embodiment may be fixed to the base portion 1221 by, for example, adhesion, press fitting, screws, or the like.

The magnetic members 1224, 1224a can be produced by techniques other than press working, for example, they may be produced by cutting work.

In the above preferred embodiment, although the protrusions 4321, 4324, 71 are arranged to extend downwardly from an approximate tip end in the radial direction of the tooth covering portions 432 in the lower insulator, the protrusions may protrude from positions which are closer to the center axis J1 than the positions of the tip ends of the tooth covering portions 432. In other words, in an almost outer portion in the radial direction of the lower insulator with respect to the center axis J1, a lower end portion of the insulator is made as protrusions which protrude toward the base portion 1221 from the tip ends of the tooth portions 412 or positions near the tip ends, and the cylindrical portion 51 of the magnetic member is inserted into the protrusions. With this structure, it is possible to easily locate the flat portion 52 close to the field magnet 1213. In the magnetic members according to the first and second preferred embodiments, the cylindrical portion 51 is not necessarily cut out as long as the notch 521 is provided in the flat portion 52.

In the above preferred embodiments, there may be a case where a cylindrical holder is provided in the center position of the base portion 1221 instead of the sleeve housing 1232, and the stator 1222 is directly fixed to the base portion 1221 around the holder. The technique for fixing the magnetic member to the stator 1222 and the printed wiring board 1223 can be applied to a two-phase motor, a three-phase motor, or the like. In a case where a plurality of hall elements are provided in the printed wiring board 1223 like the three-phase motor, a plurality of notches are provided in the magnetic member.

The yoke 1212 in the rotor portion 121 of the motor 12 has a cylindrical shape but may be a substantially cylindrical shape with a closed end where the yoke 1212 and the rotor holder 1211 are fitted with each other. In this case, the shaft 1214 projects downwardly from the center portion of the yoke 1212. The shaft 1214 may be supported by ball bearings instead of the bearing mechanism 120.

The present invention can be applied to, for example, a motor which is mounted to a fan apparatus such as an axial fan and a centrifugal fan, and further applied to motors other than motors mounted to a fan apparatus.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An electric motor comprising:
   a stator portion;
   a rotor portion arranged to rotate about a center axis; and
   a bearing mechanism arranged to rotatably support the rotor portion relative to the stator portion; wherein
   the rotor portion includes:
      a rotor holder having a substantially cylindrical shape with a closed end; and
      a field magnet fixed to an inner circumference of the rotor holder;
   the stator portion includes:
      a stator disposed inside of the rotor holder and arranged to generate a torque between the field magnet and the stator, the stator including a stator core, an insulator, and coils;
      a base portion located below the rotor holder, the stator core being fixed to the base portion either directly or indirectly; and
      a magnetic member located between the field magnet and the base portion and arranged to generate a magnetic attractive force between the field magnet and the magnetic member; and
   the magnetic member includes:
      a substantially cylindrical portion into which a lower end portion of the insulator of the stator is inserted, the lower end portion being a portion of an outer portion of the insulator and opposing the base portion;
      a flat portion having a substantially annular shape which expands outwardly in a radial direction from a lower edge of the substantially cylindrical portion and opposes a lower edge of the field magnet; and
   the magnetic member is made of a single piece of material and the substantially cylindrical portion is arranged to extend in an axial direction perpendicular or substantially perpendicular to a direction in which the flat portion extends.

2. The electric motor according to claim 1, wherein an inner circumferential surface of the substantially cylindrical portion contacts the lower end portion of the insulator.

3. The electric motor according to claim 1, wherein the stator includes a plurality of teeth extending outwardly in the radial direction; and the lower end portion of the insulator includes a plurality of protrusions which protrude toward the base portion from tip ends of the plurality of teeth or from positions between the tip ends and the center axis.

4. The electric motor according to claim 1, wherein the insulator includes an engaging portion arranged to engage with the cylindrical portion of the magnetic member to fix a position of the magnetic member in a direction of the center axis.

5. The electric motor according to claim 4, wherein the flat portion is fixed to the base portion in a direction substantially parallel to the center axis.

6. The electric motor according to claim 1, further comprising a printed wiring board that is fixed relative to the stator between the magnetic member and the base portion, wherein the flat portion of the magnetic member is fixed to the printed wiring board.

7. The electric motor according to claim 1, wherein the flat portion includes a notch, and the field magnet opposes a hall element arranged to detect a rotational position of the field magnet through the notch.

8. The electric motor according to claim 7, wherein the flat portion only includes one notch.

9. A fan apparatus, comprising:
   an electric motor; and
   a plurality of blades protruding outwardly in a radial direction from the electric motor and arranged to rotate about a center axis of the electric motor to generate air flow; wherein
   the electric motor includes:
      a stator portion;
      a rotor portion arranged to rotate about a center axis; and
      a bearing mechanism arranged to rotatably support the rotor portion relative to the stator portion;

the rotor portion includes:
- a rotor holder having a substantially cylindrical shape with a closed end; and
- a field magnet fixed to an inner circumference of the rotor holder;

the stator portion includes:
- a stator disposed inside of the rotor holder and arranged to generate a torque between the field magnet and the stator, the stator including a stator core, an insulator, and coils;
- a base portion located below the rotor holder, the stator core being fixed to the base portion either directly or indirectly; and
- a magnetic member which is positioned between the field magnet and the base portion and arranged to generate a magnetic attractive force between the field magnet and the magnetic member; and the magnetic member includes:
- a substantially cylindrical portion into which a lower end portion of the insulator of the stator is inserted, the lower end portion being a portion of an outer portion of the insulator and opposing the base portion;
- a flat portion having a substantially annular shape which expands outwardly in a radial direction from a lower edge of the cylindrical portion and opposes a lower edge of the field magnet; and the magnetic member is made of a single piece of material and the substantially cylindrical portion is arranged to extend in an axial direction perpendicular or substantially perpendicular to a direction in which the flat portion extends.

10. The fan apparatus according to claim 9, wherein an inner circumferential surface of the substantially cylindrical portion contacts the lower end portion of the insulator.

11. The fan apparatus according to claim 9, wherein the stator includes a plurality of teeth extending outwardly in the radial direction, and the lower end portion of the insulator includes a plurality of protrusions which protrude toward the base portion from tip ends of the plurality of teeth or from positions between the tip ends and the center axis.

12. The fan apparatus according to claim 9, wherein the insulator includes an engaging portion arranged to engage with the substantially cylindrical portion of the magnetic member and to fix a position of the magnetic member in a direction of the center axis.

13. The fan apparatus according to claim 12, wherein the flat portion is fixed to the base portion in a direction substantially parallel to the center axis.

14. The fan apparatus according to claim 9, wherein the electric motor further comprises a printed wiring board that is fixed relative to the stator between the magnetic member and the base portion, and the flat portion of the magnetic member is fixed to the printed wiring board.

15. The fan apparatus according to claim 9, wherein the flat portion includes a notch, and the field magnet opposes a hall element arranged to detect a rotational position of the field magnet through the notch.

16. The fan apparatus according to claim 15, wherein the flat portion only includes one notch.

* * * * *